United States Patent
Kim et al.

(10) Patent No.: US 12,549,087 B2
(45) Date of Patent: Feb. 10, 2026

(54) POWER CIRCUIT OPERATING IN PULSE WIDTH MODULATION MODE AND LOW DROP-OUT MODE AND METHOD OF OPERATING THE SAME

(71) Applicant: ABOV Semiconductor Co., Ltd., Cheongju-si (KR)

(72) Inventors: Hong Jin Kim, Seoul (KR); Ho Jin Jeon, Ansan-si (KR)

(73) Assignee: ABOV Semiconductor Co., Ltd., Cheongju-si (KR)

( * ) Notice: Subject to any disclaimer, the term of this patent is extended or adjusted under 35 U.S.C. 154(b) by 190 days.

(21) Appl. No.: 18/522,142

(22) Filed: Nov. 28, 2023

(65) Prior Publication Data

US 2024/0176374 A1 May 30, 2024

(30) Foreign Application Priority Data

Nov. 29, 2022 (KR) .................. 10-2022-0163521

(51) Int. Cl.
*H02M 3/158* (2006.01)
*H02M 1/00* (2006.01)

(52) U.S. Cl.
CPC ....... *H02M 1/0045* (2021.05); *H02M 1/0032* (2021.05); *H02M 3/158* (2013.01)

(58) Field of Classification Search
CPC ... H02M 1/0045; H02M 3/158; H02M 1/0032
See application file for complete search history.

(56) References Cited

U.S. PATENT DOCUMENTS

| | | | |
|---|---|---|---|
| 9,160,875 B2 | 10/2015 | Miura | |
| 9,276,404 B2 | 3/2016 | Kayama | |
| 9,343,950 B2 | 5/2016 | Kayama | |
| 10,044,263 B2 | 8/2018 | Kumar | |
| 2006/0028188 A1* | 2/2006 | Hartular | H02M 3/156 323/273 |
| 2010/0026260 A1* | 2/2010 | Xu | H02M 3/156 323/283 |
| 2017/0110962 A1* | 4/2017 | Chang | H02M 1/44 |
| 2017/0126045 A1* | 5/2017 | Chen | H02J 7/0069 |

FOREIGN PATENT DOCUMENTS

| | | |
|---|---|---|
| JP | 2018-046715 A | 3/2018 |
| KR | 10-2019-0089611 A | 7/2019 |
| KR | 10-2020-0108670 A | 9/2020 |

OTHER PUBLICATIONS

Yoo, Sung Mok, "Design of a High-Efficiency Triple-Mode DC-DC Buck Converter," Dec. 2011, Department of Electronics Engineering Graduate School, University of Incheon, Incheon, Republic of Korea.

\* cited by examiner

*Primary Examiner* — Alex Torres-Rivera
(74) *Attorney, Agent, or Firm* — United One Law Group LLC; Kongsik Kim; Jhongwoo Peck

(57) ABSTRACT

A power circuit for generating an output power voltage from an input power voltage includes an input power voltage node configured such that an input power voltage is applied thereto; a first node configured to generate an output power voltage; a mode common power switch circuit connected to the input power voltage node and the first node; and a mode controller circuit configured to generate a mode control signal that controls an operation mode of the mode common power switch circuit to any one of at least one pulse modulation mode and a low-dropout (LDO) mode.

16 Claims, 22 Drawing Sheets

POWER CIRCUIT OPERATING IN PULSE WIDTH MODULATION MODE AND LOW DROP-OUT MODE AND METHOD OF OPERATING THE SAME

CROSS-REFERENCE TO RELATED APPLICATION

This application claims priority from Korean Application No. 10-2022-0163521 filed on Nov. 29, 2022, which is incorporated herein by reference in its entirety.

STATEMENT REGARDING FOREIGN RIGHTS

The present invention was derived from the research conducted as part of the "Development of Next-generation Intelligent Semiconductor Technology" Project and the "Development of Lightweight AI SoC Technology for Smart Home Appliances using 40 nm or lower Process" Task sponsored by the Korea Planning & Evaluation Institute of Industrial Technology [Task Management Serial Number: 20016065].

TECHNICAL FIELD

The present invention generally relates to a power circuit and a method of operating the power circuit, and more particularly to a power circuit that reduces the area thereof and a method of operating the power circuit.

RELATED ART

The content described in this section simply provides background information for the present invention, but does not constitute prior art.

Recently, a small area and low-power operation are important for mobile devices. Mobile devices require a power circuit that generates an output power voltage from an input power voltage such as a battery voltage.

For low-power operation, a power circuit or power supply device uses a DC-DC converter performing switching operation or a regulator performing continuous operation depending on the application.

For efficient power supply, a DC-DC converter and a regulator need to generate n output power voltage while switching with each other.

In the prior art, a DC-DC converter and a low-dropout (LDO) regulator are designed separately and configured to operate according to the application. An issue arises in that the area of an overall circuit becomes larger than that of a circuit using a single circuit because two circuits are employed in this prior art.

As disclosed in U.S. Pat. No. 9,160,875 entitled "Image Forming Apparatus using Technique for Controlling Power Supply," this prior art implements a DC-DC converter and an LDO regulator separately and operates either the LDO regulator or the DC-DC converter depending on the change in load.

The DC-DC converter and the LDO regulator each include a large-area power switch, so that a design technique that reduces the area of the overall circuit while implementing both the functions of the DC-DC converter and the LDO regulator is required for efficient power supply.

SUMMARY

An object of the present invention is to integrate a DC-DC converter and a continuously operating LDO regulator into a single circuit without increasing the area thereof.

An object of the present invention is to control the operation mode of a mode common power switch, used in common for a plurality of operation modes, to any one of a DC-DC converter mode and an LDO mode. In this case, the DC-DC converter mode may be any one of a pulse width modulation (PWM) mode and a pulse frequency modulation (PFM) mode.

An object of the present invention is to propose a low-power, high-efficiency power circuit that reduces the area thereof by using a mode common power switch circuit shared between a DC-DC converter mode and an LDO mode, which is required for efficient low-power operation.

The objects of the present invention are not limited to those described above, and other objects not described will be clearly understood by those skilled in the art from the following description.

According to an aspect of the present invention, there is provided a power circuit for generating an output power voltage from an input power voltage, the power circuit comprising: an input power voltage node configured such that the input power voltage is applied thereto; a first node configured to generate the output power voltage; a mode common power switch circuit connected to the input power voltage node and the first node; and a mode controller circuit configured to generate a mode control signal that controls an operation mode of the mode common power switch circuit to be any one of at least one pulse modulation mode and a low-dropout (LDO) mode.

The mode common power switch circuit may comprise a first power switch configured to form a high side switch and include a plurality of split segments; and a second power switch configured to form a low side switch, wherein at least some of the plurality of split segments may be selectively turned on based on the mode control signal.

The power circuit may further comprise: a driver switch circuit configured to selectively apply a driving signal to the at least some of the plurality of split segments to be turned on based on the mode control signal.

The power circuit may further comprise: an output power voltage node configured to output the output power voltage; and a feedback circuit connected to the output power voltage node and configured to generate a voltage feedback signal proportional to the output power voltage.

For the power circuit, in the LDO mode, an output signal of a comparator generated based on results of a comparison between the feedback voltage signal and a reference voltage may be transferred to an input of the mode common power switch circuit via a first switch; and the first node may be directly connected to the output power voltage node via a third switch.

For the power circuit, in the at least one pulse modulation mode, the first node may be connected to the output power voltage node via an inductor; the feedback voltage signal may be transferred to an input of a comparator and compared with a reference voltage; and an output signal of the comparator generated based on results of a comparison between the feedback voltage signal and the reference voltage may be transferred to a timing control circuit.

The power circuit may further comprise: a mode common error amplifier configured to operate in common in the at least one pulse modulation mode and the LDO mode; and a resistor-capacitor network configured such that one end thereof is connected to an output terminal of the mode common error amplifier and other end thereof is connected to an input terminal of the mode common error amplifier via a fourth switch.

The power circuit may further comprise: an output power voltage node configured to output the output power voltage; and a feedback circuit connected to the output power voltage node and configured to generate a feedback voltage signal proportional to the output power voltage.

For the power circuit, in the LDO mode, the feedback voltage signal and a reference voltage may be input to the mode common error amplifier; and an output signal of the mode common error amplifier may be transferred to an input of the mode common power switch circuit via a first switch.

For the power circuit, the one end of the resistor-capacitor network may be connected to an input of the mode common power switch circuit via the first switch, and the other end of the resistor-capacitor network may be connected to the first node via a second switch, so that the resistor-capacitor network may operate as a compensation circuit for the mode common power switch circuit.

The power circuit may further comprise: an output power voltage node configured to output the output power voltage; and a feedback circuit connected to the output power voltage node and configured to generate a feedback voltage signal proportional to the output power voltage.

For the power circuit, in a pulse width modulation mode of the at least one pulse modulation mode, the other end of the resistor-capacitor network may be connected to the feedback voltage signal via a fourth switch, so that the resistor-capacitor network may operate as a compensation circuit that is connected to input and output terminals of the mode common error amplifier.

The power circuit may further comprise: an LDO mode error amplifier configured to compare a feedback voltage signal, proportional to a voltage of the first node in the LDO mode, and a reference voltage signal to generate an output signal based on results of the comparison, and transfer the output signal to the driver switch circuit.

According to an aspect of the present invention, there is provided a method of operating a power circuit to generate an output power voltage from an input power voltage, the method comprising: generating a mode control signal that controls an operation mode of a mode common power switch circuit connected to an input power voltage node to which the input power voltage is applied and a first node which generates the output power voltage; and controlling the operation mode of the mode common power switch circuit to be any one of at least one pulse modulation mode and a low-dropout (LDO) mode based on the mode control signal.

For the method, in controlling the operation mode of the mode common power switch circuit, at least some of a plurality of split segments included in a first power switch constituting a high side switch in the mode common power switch circuit may be selectively turned on based on the mode control signal.

For the method, in controlling the operation mode of the mode common power switch circuit, a feedback voltage signal proportional to the output power voltage may be generated by a feedback circuit connected to an output power voltage node that outputs the output power voltage.

For the method, in the LDO mode, an output signal of a comparator generated based on results of a comparison between the feedback voltage signal and a reference voltage may be transferred to an input of the mode common power switch circuit via a first switch; and the first node may be directly connected to the output power voltage node via a third switch.

For the method, in the at least one pulse modulation mode, the first node may be connected to the output power voltage node via an inductor; the feedback voltage signal may be transferred to an input of a comparator and compared with a reference voltage; and an output signal of the comparator generated based on results of a comparison between the feedback voltage signal and the reference voltage may be transferred to a timing control circuit.

For the method, in the LDO mode, the feedback voltage signal and a reference voltage may be input to a mode common error amplifier that operates in common in the at least one pulse modulation mode and the LDO mode; and an output signal of the mode common error amplifier may be transferred to an input of the mode common power switch circuit via a first switch.

For the method, one end of a resistor-capacitor network may be connected to an output terminal of the mode common error amplifier, and the one end is connected to an input of the mode common power switch circuit via the first switch, and other end of the resistor-capacitor network may be connected to the first node via a second switch, so that the resistor-capacitor network may operate as a compensation circuit for the mode common power switch circuit.

For the method, in a pulse width modulation mode of the at least one pulse modulation mode, one end of a resistor-capacitor network may be connected to an output terminal of a mode common error amplifier that operates in common in the pulse width modulation mode and the LDO mode, and other end of the resistor-capacitor network may be connected to the feedback voltage signal via a fourth switch, so that the resistor-capacitor network may operate as a compensation circuit that is connected to input and output terminals of the mode common error amplifier.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1A:
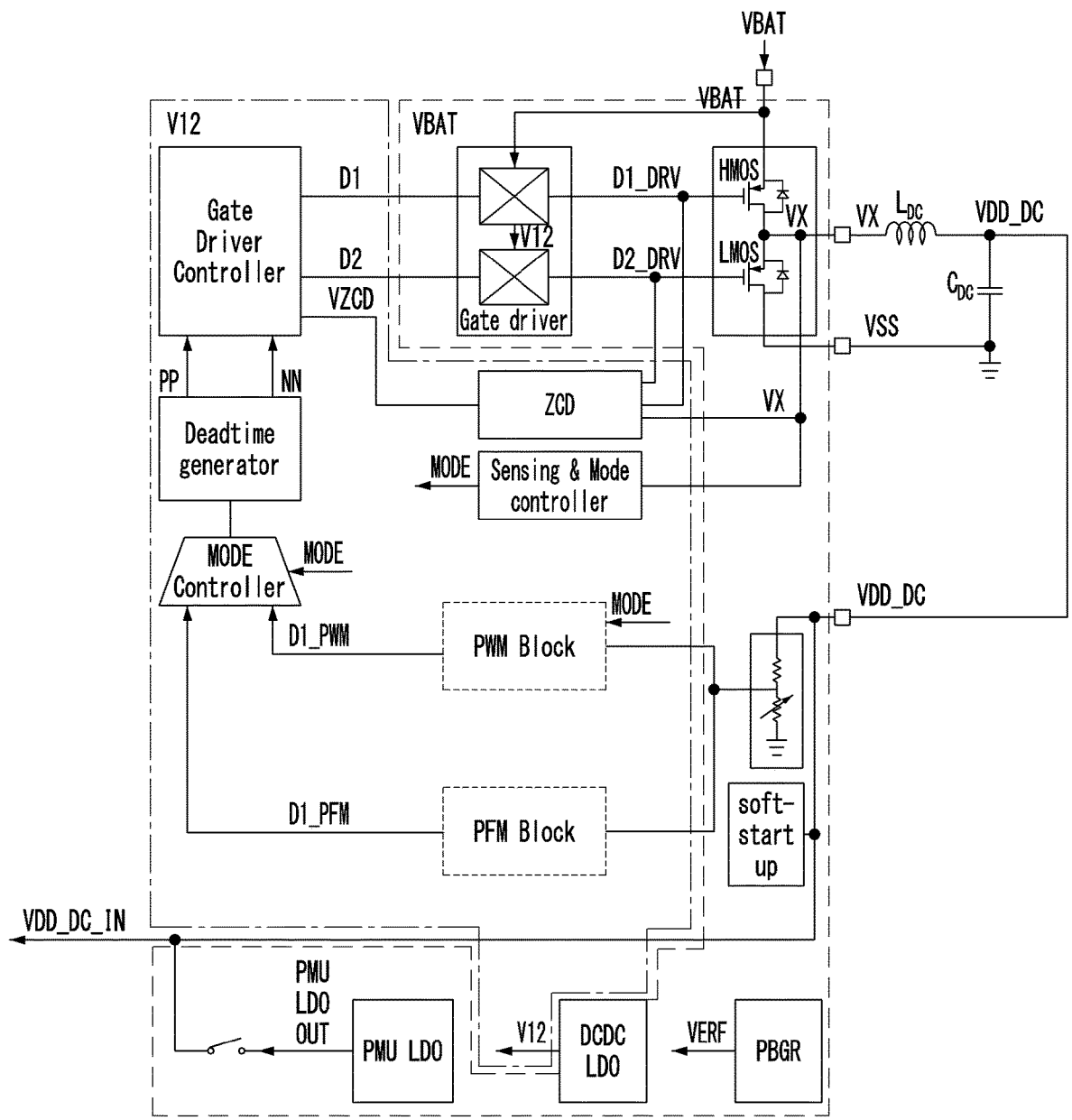
FIGS. 1A-1C are diagrams showing a power circuit, including a DC-DC converter and its peripheral circuits, as a comparative example for the present invention.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Meanwhile, even a technology known before the filing date of the present application may be included as a part of the configuration of the present disclosure when necessary, and will be described herein without obscuring the spirit of the present disclosure. However, in describing the configuration of the present disclosure, the detailed description of a technology known before the filing date of the present application that those of ordinary skill in the art can clearly understand may obscure the spirit of the present disclosure, and thus a detailed description of the related art will be omitted.

The items disclosed in prior art literature, including the implementation and operation method of a general buck mode and/or boost mode DC-DC converter circuit, the implementation and operation method of an LDO circuit, and the implementation and operation method of a zero-crossing detection (ZCD) circuit, may be included as part or all of each of some configurations of the present invention within the range that is consistent with the purpose of the invention. Those skilled in the art may apparently infer the associations between the purposes and configurations of the present invention from the content of the prior art literature. Accordingly, an excessively detailed description that may obscure the purpose of the present invention will be omitted, and the description will be replaced with the introduction of the above-described prior art literature.

However, the present disclosure is not intended to claim the rights to these related technologies, and the content of the related technologies may be included as part of the present disclosure without departing from the spirit of the present disclosure.

Embodiments of the present invention will be described in more detail below with reference to the accompanying drawings. In order to facilitate the overall understanding of the present invention in the following description of the present invention, the same reference numerals will be used for the same components throughout the drawings, and redundant descriptions of the same components will be omitted.

Figure 1B:
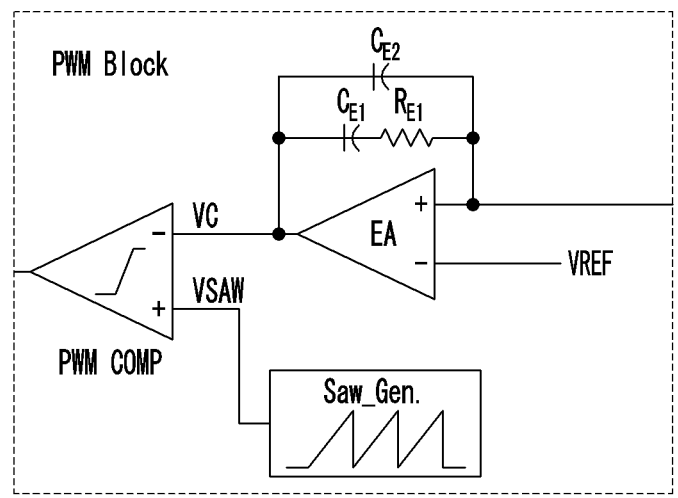
Figure 1C:
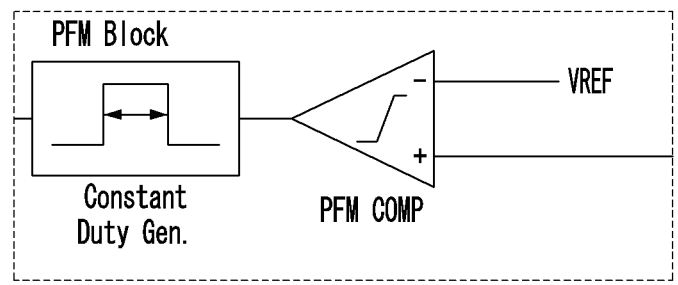

FIGS. 1A, 1B, and 1C are diagrams showing a power circuit, including a DC-DC converter and its peripheral circuits, as a comparative example for the present invention.

This circuit is a power circuit in which internal power VDD_DC_IN is generated from an input power voltage of an input power voltage node VBAT to which the input power voltage is applied. In this power circuit, a DC-DC converter including HMOS and LMOS, and PMU_LDO are included.

The DC-DC converter and PMU_LDO are individually formed circuits. They include respective power switches, so that a problem arises in that the area of an overall circuit increases by the area occupied by these power switches.

However, the example of FIGS. 1A-1C are a comparative example used to describe embodiments of the present invention, and not all the configurations of FIGS. 1A-1C constitute prior art.

Figure 2A:
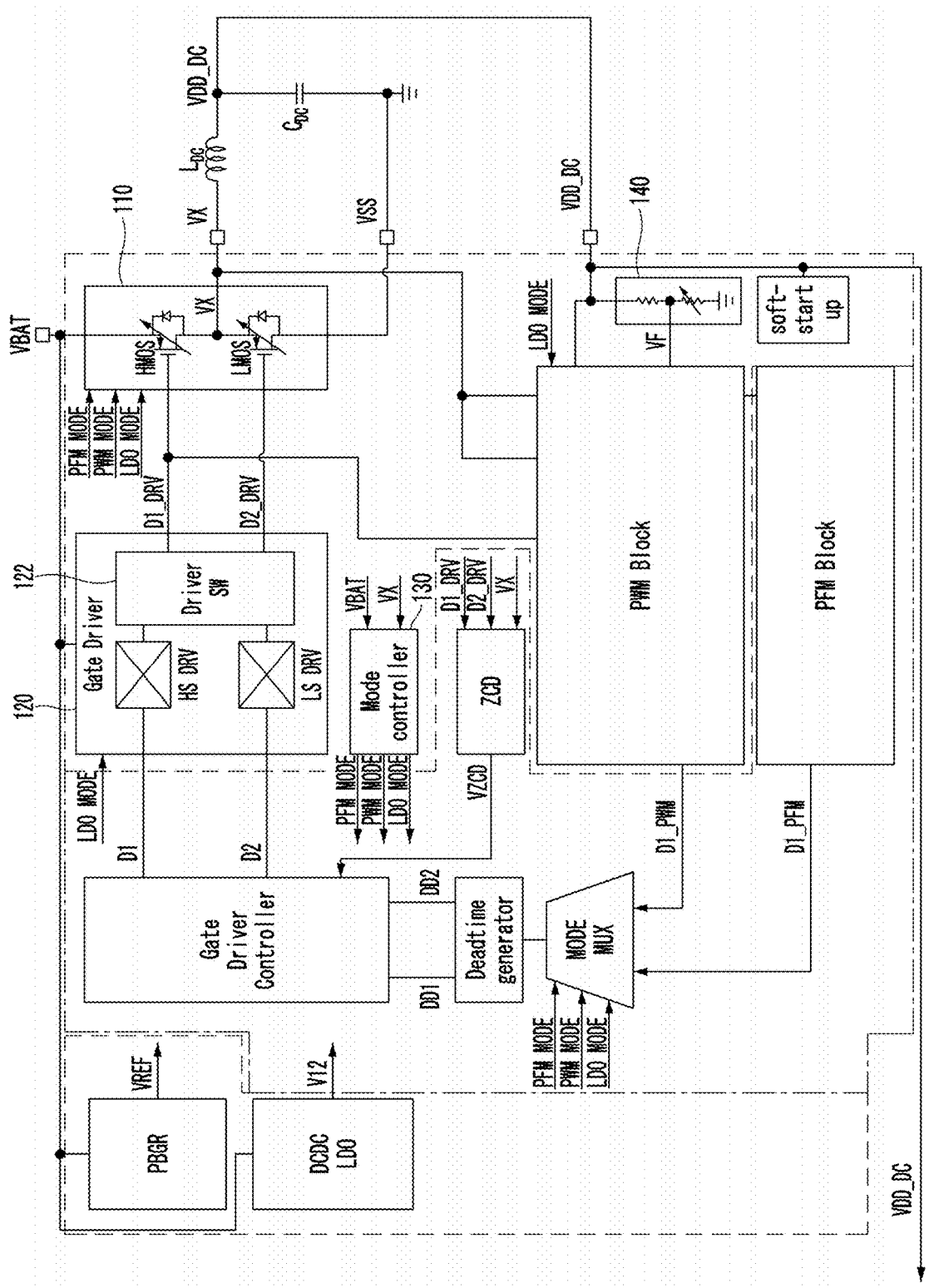
FIGS. 2A-2C are diagrams showing circuit according to an embodiment of the present invention.
Figure 2B:
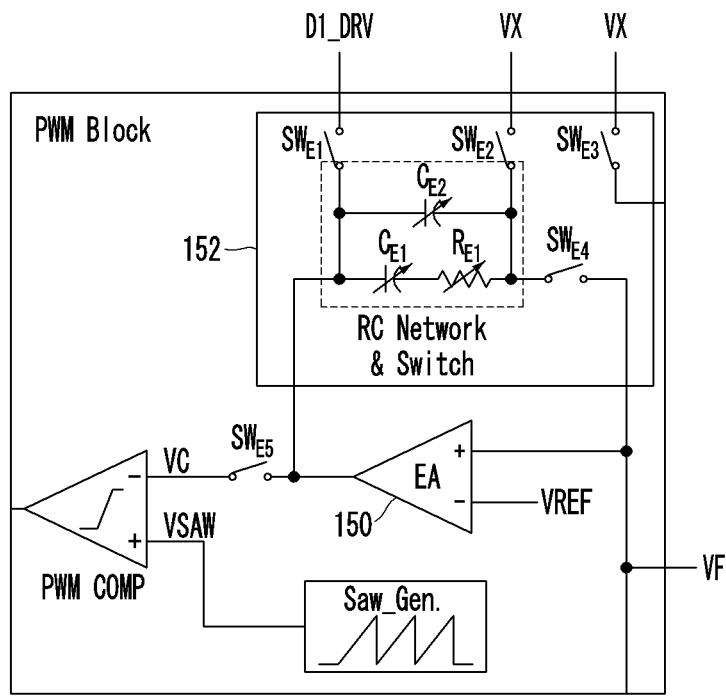
Figure 2C:
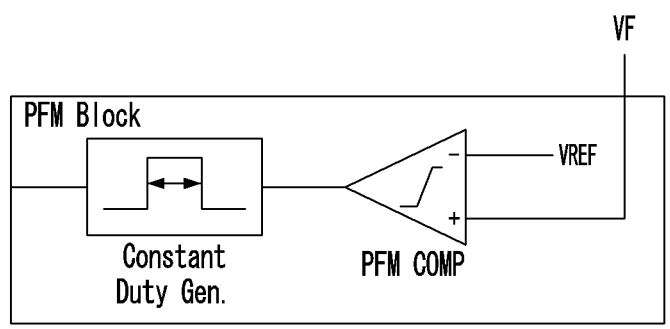

FIGS. 2A, 2B, and 2C are diagrams showing a power circuit according to an embodiment of the present invention.

The power circuit according to the embodiment of the present invention is a power circuit for generating an output power voltage from an input power voltage, the power circuit including: an input power voltage node VBAT configured such that the input power voltage is applied thereto; a first node VX configured to generate the output power voltage; a mode common power switch circuit 110 connected to the input power voltage node VBAT and the first node VX; and a mode controller circuit 130 configured to generate a mode control signal that controls the operation mode of the mode common power switch circuit 110 to any one of at least one pulse modulation mode and a low-dropout (LDO) mode.

When the comparative example of FIGS. 1A-1C and the embodiment of the present invention of FIGS. 2A-2C are compared with each other, the PMU LDO block of FIG. 1A is integrated into the power circuit of FIGS. 2A, so that the power circuit of the present invention of FIG. 2A can have an area reduced by the area of the PMU LDO of FIG. 1A and implement operation and performance equivalent to those of the comparative example of FIGS. 1A-1C.

The mode common power switch circuit 110 may include: a first power switch HMOS configured to form a high side switch and include a plurality of split segments; and a second power switch LMOS configured to form a low side switch.

At least some of the plurality of split segments may be selectively turned on based on the mode control signal.

Based on the mode control signal, a driving signal may be selectively applied to the at least some of the plurality of split segments to be turned on.

The power circuit according to the embodiment of the present invention may further include: an output power voltage node VDD_DC configured to output the output power voltage; and a feedback circuit connected to the output power voltage node VDD_DC and configured to generate a feedback voltage signal VF proportional to the output power voltage. The feedback circuit may be a voltage divider circuit 140.

In the LDO mode, the output signal of a comparator generated based on the results of the comparison between the feedback voltage signal VF and a reference voltage VREF may be transferred to the input of the mode common power switch circuit 110 via a first switch SW_E1, and the first node VX may be directly connected to the output power voltage node VDD_DC via a third switch SW_E3 (turned ON).

In the at least one pulse modulation mode, the first node VX may be connected to the output power voltage node VDD_DC via an inductor, and the feedback voltage signal VF may be transferred to the input of the comparator and compared with the reference voltage VREF. The output signal of the comparator generated based on the results of the comparison between the feedback voltage signal VF and the reference voltage VREF may be transferred to a timing control circuit.

The power circuit according to the embodiment of the present invention may further include: a mode common error amplifier 150 configured to operate in common in the at least one pulse modulation mode and the LDO mode; and a resistor-capacitor network 152 configured such that one end thereof is connected to the output terminal of the mode common error amplifier 150 and the other end thereof is connected to the input terminal of the mode common error amplifier 150 via a fourth switch SW_E4.

In the LDO mode, the feedback voltage signal VF and the reference voltage VREF may be transferred to the inputs of the mode common error amplifier 150, and the output signal of the mode common error amplifier 150 may be transferred to the input of the mode common power switch circuit 110 via the first switch SW_E1.

In the LDO mode, one end of the resistor-capacitor network 152 may be connected to the input of the mode common power switch circuit 110 via the first switch SW_E1 and the other end of the resistor-capacitor network 152 may be connected to the first node VX via the second switch SW_E2, so that the resistor-capacitor network 152 can operate as a compensation circuit for the mode common power switch circuit 110.

In the PWM mode of the at least one pulse modulation mode, the other end of the resistor-capacitor network 152 is connected to the feedback voltage signal VF via the fourth switch SW_E4, so that the resistor-capacitor network 152 can operate as a compensation circuit that is connected to the input and output terminals of the mode common error amplifier 150.

The power circuit according to an embodiment of the present invention may include a first power switch HMOS, a second power switch LMOS, a capacitor CDC, an inductor LDC, a logic circuit for pulse frequency modulation (PFM Block), a logic circuit for pulse width modulation (PWM Block), a deadtime generator adapted to be a timing control circuit, a gate driver controller, a gate driver 120, a sensing & mode controller adapted to be a mode controller 130, a zero current detector ZCD, a soft-start up, a DCDC LDO configured to generate internal power together with an MODE MUX, and a pseudo bandgap reference generator PBGR configured to generate an internal reference voltage.

For ease of description, the DCDC LDO is a power supply circuit that generates an internal power of 1.2 V from the input power voltage node VBAT. The DCDC LDO may be a power supply circuit that is formed separately from the power circuit according to an embodiment of the present invention. The DCDC LDO is a component introduced for ease of description, and the spirit of the present invention should not be limited by this embodiment.

The power circuit according to the embodiment of the present invention may control the first power switch HMOS and the second power switch LMOS according to a change in the pulse width or pulse frequency of each of the first switching signal D1_DRV and the second switching signal D2_DRV. In this case, a feedback method based on the voltage of the first node VX may be applied to automatically adjust the output voltage of the power circuit to a desired level.

The first power switch HMOS may be turned on for the first switching section of one switching cycle and turned off for the remaining section of the switching cycle by the first switching signal D1_DRV. During the turned-on section, energy is supplied from the input power voltage node VBAT to the inductor LDC. In this case, the first switching signal D1_DRV is turned on after the second switching signal D2_DRV has been blocked.

The second power switch LMOS may be turned on for the second switching section of one switching cycle and turned off for the remaining section of the switching cycle by the second switching signal D2_DRV. During the turned-on section, the inductor may be electrically connected to a ground terminal VSS, and may form an electrical path that passes through the capacitor CDC, the inductor LDC, and the ground terminal VSS.

In this case, the second switching signal D2_DRV is turned on after the first switching signal D1_DRV has been blocked.

Every switching cycle may be divided into a first switching section in which the first switching signal D1_DRV is turned on and the second switching signal D2_DRV is blocked, a second switching section in which the first switching signal D1_DRV is blocked and the second switching signal D2_DRV is turned on, and a common blocking section in which both the first and second switching signals D1_DRV and D2_DRV are blocked.

In general, a step-down DC-DC converter repeats the operation of accumulating energy from the input power voltage node VBAT to the inductor LDC in the first switching section of every switching cycle and transferring energy in the form of current from the inductor LDC to the capacitor CDC while blocking an input power source in the second switching section.

A general DC-DC converter may be operated by determining a pulse frequency modulation (PFM) mode and a pulse width modulation (PWM) mode depending on the load.

In the PFM mode, operation may be performed in such a manner that the switching cycle becomes longer as the power consumption of the load decreases and the switching cycle becomes shorter as the power consumption of the load increases.

In the PWM mode, the switching cycle is determined by the cycle of a sawtooth signal inside the PWM Block. Likewise, operation is performed by adjusting the turned-on width of a signal cycle according to the power consumption of the load.

The DC-DC converter in the PFM mode may compare the reference voltage VREF output from the PBGR and the feedback voltage signal VF through a comparator PFM COMP in the pulse frequency modulator (PFM Block), and may output a signal D1_PFM having a predetermined width by operating a constant duty generator when the VF voltage is lower than the reference voltage VREF.

The output signal of the MODE MUX generated based on the PFM mode signal is input to the deadtime generator, and DD1 and DD2 may be output. A regulation operation may be performed using the turning on and turning off of the first power switch HMOS and the second power switch LMOS, the inductor LDC, and the capacitor CDC based on the frequencies of the first switching signal D1_DRV and the second switching signal D2_DRV finally through the gate driver controller and the gate driver 120. In the PFM mode, the voltage of the output power voltage node VDD_DC may be adjusted based on the frequency of the pulse.

The DC-DC converter in the PWM mode may output a VC voltage by comparing the reference voltage VREF output from the PBGR and the feedback voltage signal VF with each other through the mode common error amplifier (EA) 150 in the pulse width modulator (PWM Block).

In this case, sawtooth waves having a predetermined frequency may be output through a saw generation circuit, and D1_PWM having a predetermined frequency may be output through the sawtooth waves VSAW and the output voltage VC of the mode common error amplifier 150 via the comparator PWM COMP.

Finally, the first switching signal D1_DRV and the second switching signal D2_DRV may be output through the MODE MUX, the deadtime generator, the gate driver controller, and the gate driver 120. The regulation operation may be performed using the turning on and turning off of the first power switch HMOS and the second power switch LMOS, the inductor LDC, and the capacitor CDC based on the widths of the first switching signal D1_DRV and the second switching signal D2_DRV.

The mode controller circuit 130 may generate a mode control signal based on the first node VX and the input power voltage node VBAT. For example, when the difference between the input power voltage node VBAT and the first node VX falls within the smallest section, the LDO mode may be selected. In the LDO mode, the mode common power switch circuit 110 operates continuously, and at least some of the plurality of split segments may be selectively activated based on the current driving ability according to the continuous operation of the mode common power switch circuit 110.

For example, when the difference between the input power voltage node VBAT and the first node VX falls within an intermediate section or the largest section, the PWM mode or PFM mode may be selected.

In the PWM mode or PFM mode, at least some of the plurality of split segments may be selectively activated based on the current driving ability of the mode common power switch circuit 110 that is selectively turned on and off according to the pulse signal.

Furthermore, information about the size of the load, a target command for the output power voltage VDD_DC, and/or the like may be considered as selection conditions for the operation mode. For example, the PFM mode may be selected when the load is small, and the PWM mode may be selected when the load is large.

Figure 3:
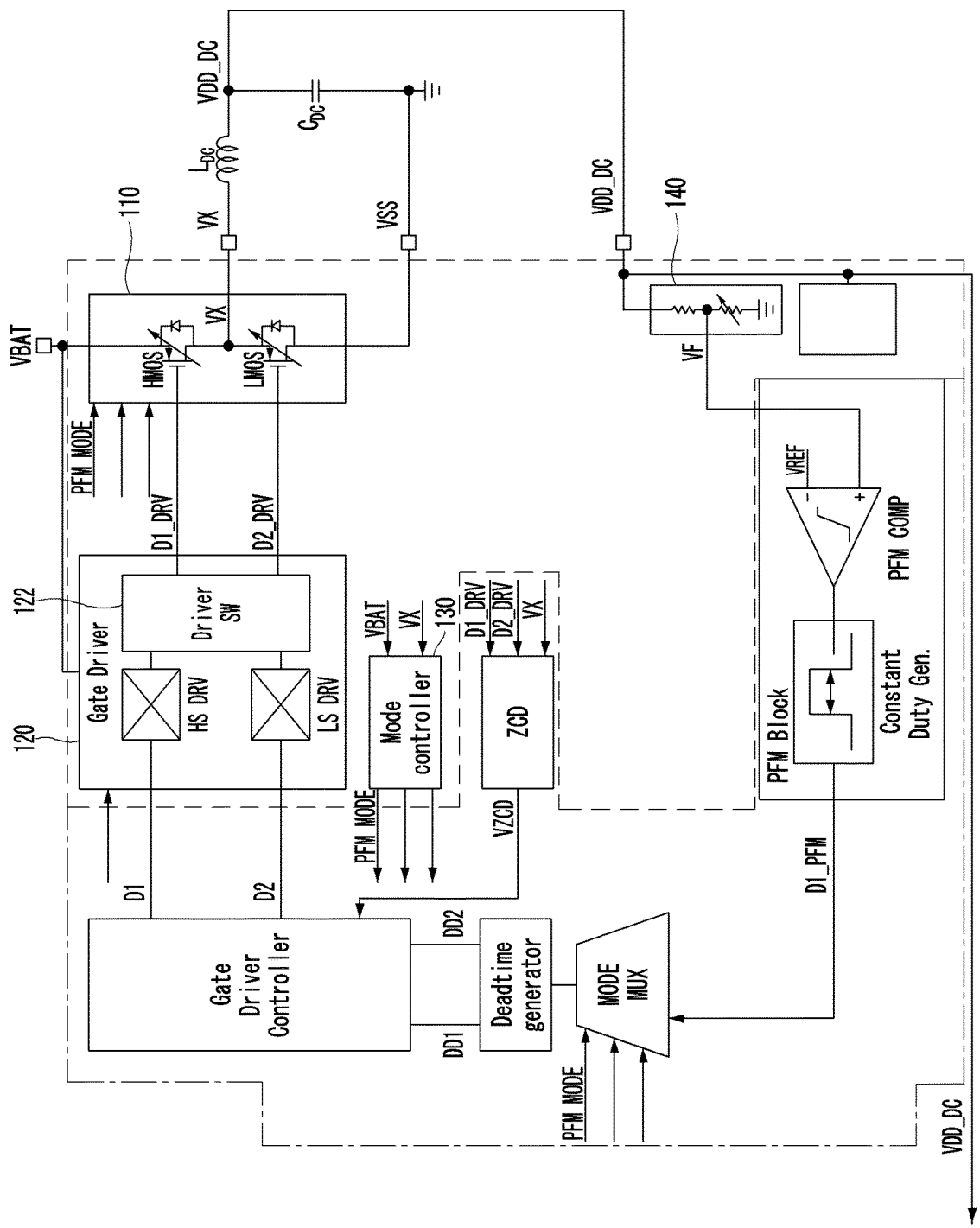
FIG. 3 is a diagram showing circuits that are activated in a PFM mode in the embodiment of FIGS. 2A-2C.

FIG. 3 is a diagram showing circuits that are activated in a PFM mode in the embodiment of FIGS. 2A-2C.

The PFM mode is a discontinuous mode. When an operation is performed in the discontinuous mode, the pulse frequency modulator (PFM Block), the MODE MUX, the deadtime generator, the gate driver controller, the gate driver 120, power MOSFETs adapted to be the mode common power switch circuit 110, a sensing & mode controller adapted to be the mode controller circuit 130, the ZCD, the feedback resistor, and the soft-start up may be activated and operated.

In this case, the MODE MUX may be changed to receive a signal D1_PFM, and the gate driver 120 and the power MOSFETS may be selected and operated to fit the PFM mode.

Figure 4:
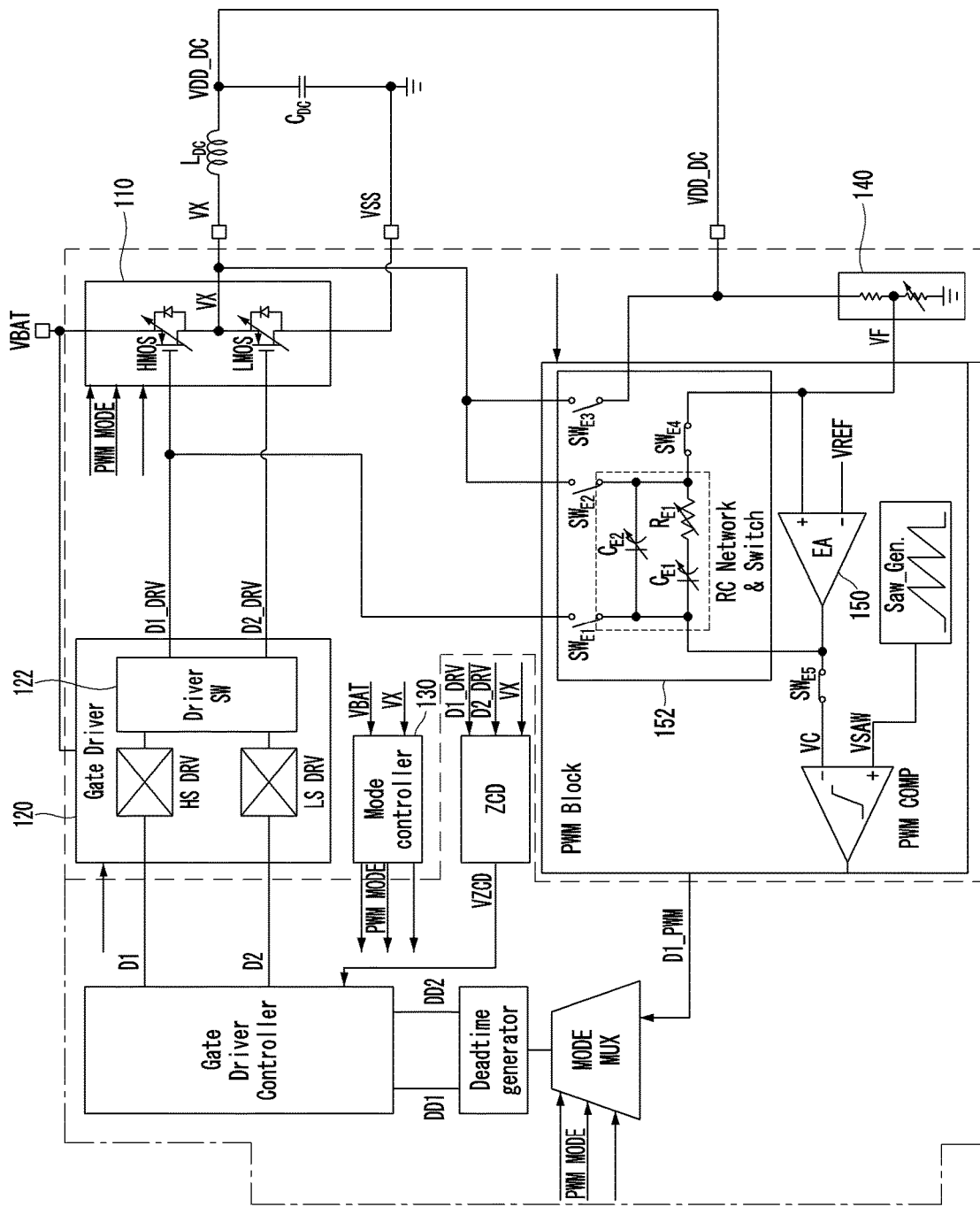
FIG. 4 is a diagram showing circuits that are activated in a PWM mode in the embodiment of FIGS. 2A-2C.

FIG. 4 is a diagram showing circuits that are activated in a PWM mode in the embodiment of FIGS. 2A-2C.

The PWM mode is a continuous mode. When an operating is performed in this continuous mode, the pulse width modulator (PWM Block), the MODE MUX, the deadtime generator, the gate driver controller, the gate driver 120, the power MOSFETs, the sensing & mode controller, the ZCD, the feedback resistor, and the soft-start up may be activated and operated.

In this case, the MODE MUX may be changed to receive the signal D1_PWM, and the gate driver 120 and the power MOSFETS may be selected and operated to fit the PWM mode.

Furthermore, in the PWM Block RC network & switch, $SW_{E1}$, $SW_{E2}$, and $SW_{E3}$ may be turned off and $SW_{E4}$ and $SW_{E5}$ may be turned on, so that the EA 150 and the PWM COMP can perform the operation of the PWM Block.

Figure 5:
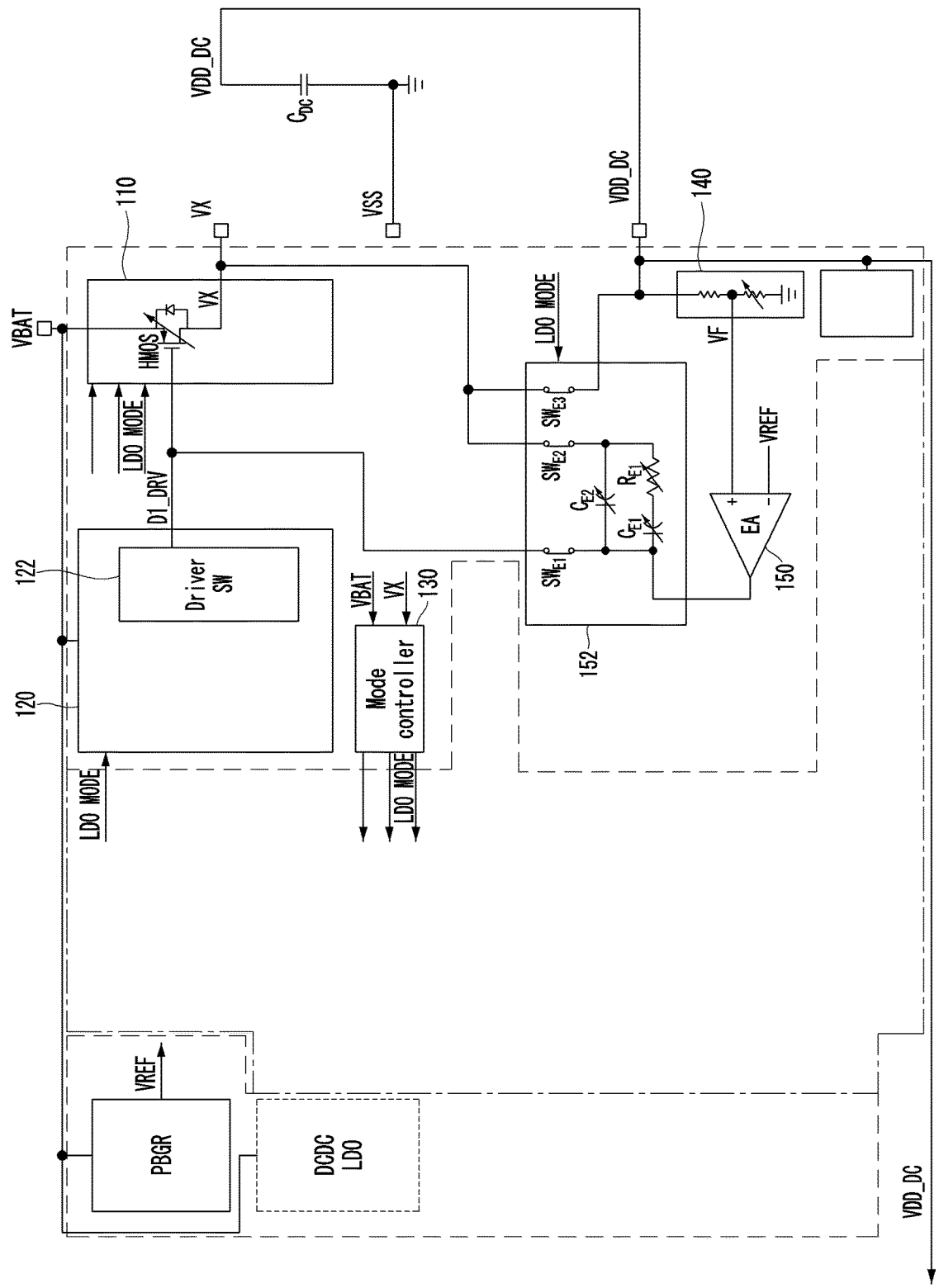
FIG. 5 is a diagram showing circuits that are activated in an LDO mode in the embodiment of FIGS. 2A-2C.

FIG. 5 is a diagram showing circuits that are activated in an LDO mode in the embodiment of FIGS. 2A-2C.

Referring to FIG. 5, in the embodiment of FIGS. 2A-2C, in the LDO mode, the EA 150 of the PWM Block, $C_{E1}$, $C_{E2}$, $R_{E1}$, the sensing & mode controller, the driver SW 122 of the gate driver 120, the HMOS of the power MOSFTETs, the feedback resistor, and the soft-start up may be activated and operated.

In the PWM Block RC network & switch, $SW_{E1}$, $SW_{E2}$, and $SW_{E3}$ may be turned on and $SW_{E4}$ and $SW_{E5}$ may be turned off, so that $C_{E1}$, $C_{E2}$, and $R_{E1}$ in the RC network 152 can be used as an RC compensation circuit for adjusting the stability of an LDO regulator and the EA 150 can be operated as an amplifier for the LDO regulator. Furthermore, as $SW_{E3}$ is turned on, the first node VX and the output power voltage node VDD_DC are directly connected, so that the inductor be external LDC can be deactivated.

In an operation in the LDO mode, the reference voltage VREF output from the PBGR and the feedback voltage signal VF may be compared with each other through the error amplifier (EA) 150 within the pulse width modulator (PWM Block), and the operation of the first power switch HMOS may be adjusted through the output D1_DRV of the error amplifier (EA) 150. When the feedback voltage signal VF is lower than the reference voltage VREF, the output voltage of the error amplifier (EA) 150 changes in a decreasing direction, and the first power switch HMOS, which is a PMOS, may be turned on more strongly and operate to increase the output voltage VDD_DC. In contrast, when the feedback voltage signal VF is higher than the reference voltage VREF, the output voltage D1_DRV of the error amplifier (EA) 150 changes in an increasing direction, and the first power switch (HMOS), which is a PMOS, may be turned on more weakly and operate to decrease the output voltage VDD_DC.

In this case, the capacitor CDC may be operated as a load capacitor for the low-dropout regulator, and CE1, CE2, and RE1 in the RC network 152 may be used as elements of an RC compensation circuit for adjusting the stability of the low-dropout regulator LDO.

Figure 6:
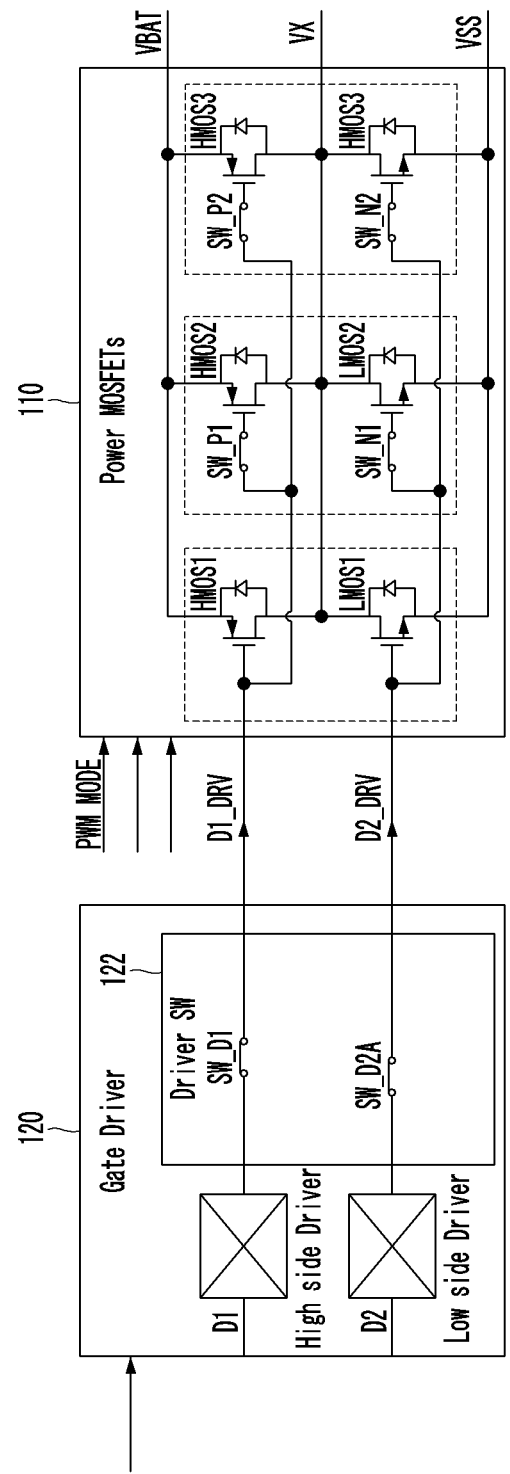
FIG. 6 is a diagram showing the PWM mode operation of the mode common power switch circuit 110 of the power circuit according to an embodiment of the present invention.

FIG. 6 is a diagram showing the PWM mode operation of the mode common power switch circuit 110 of the power circuit according to an embodiment of the present invention.

FIG. 6 shows the operations of the gate driver 120 and the power MOSFETs, which are the mode common power switch circuit 110, according to the PWM mode. In the PWM mode, SW_D1 and SW_D2A in a driver switch circuit 122 may be turned on, and SW_D2B may be turned off. In the power MOSFETs, SW_P1, SW_P2, SW_N1, and SW_N2 may be turned on, and, among the plurality of split segments, HMOS1, HMOS2, HMOS3, LMOS1, LMOS2, and LMOS3 may be turned on and operated.

Figure 7:
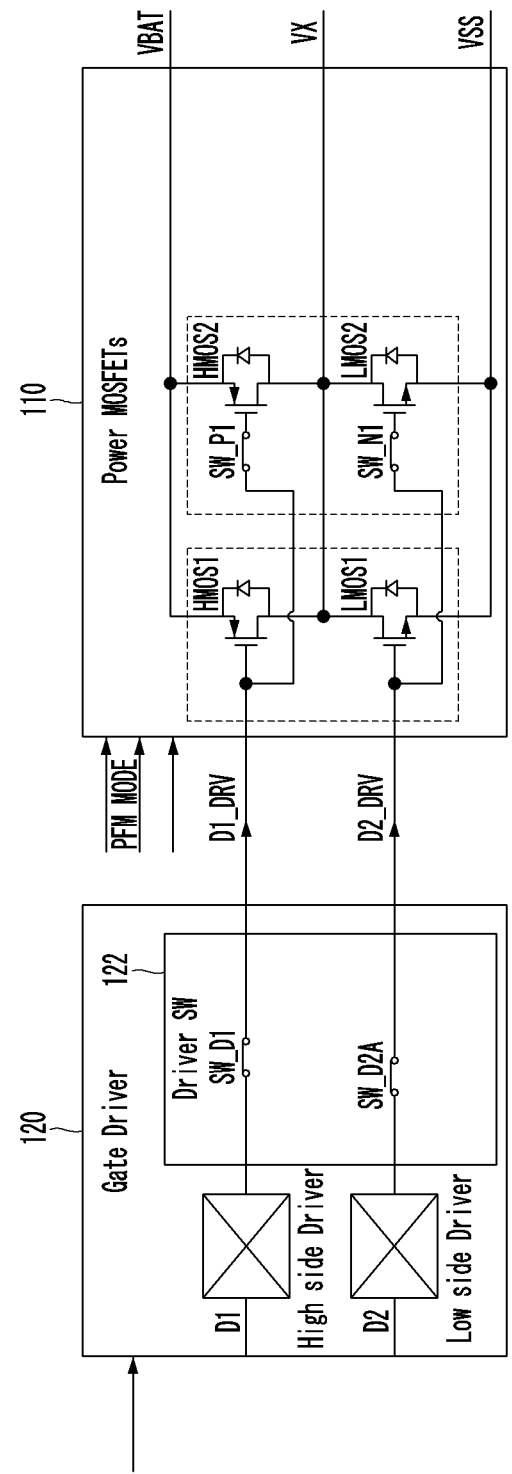
FIG. 7 is a diagram showing the PFM mode operation of the mode common power switch circuit 110 of the power circuit according to an embodiment of the present invention.

FIG. 7 is a diagram showing the PFM mode operation of the mode common power switch circuit 110 of the power circuit according to an embodiment of the present invention.

In the PFM mode, SW_D1 and SW_D2A in the driver switch circuit 122 may be turned on, and SW_D2B may be turned off. In the power MOSFETs, SW_P1 and SW_N1 may be turned on, and SW_P2 and SW_N2 may be turned off, and, among the plurality of split segments, HMOS1, HMOS2, LMOS1, and LMOS2 may be selectively turned on, and HMOS3 and LMOS3 may be turned off and operated.

Figure 8:
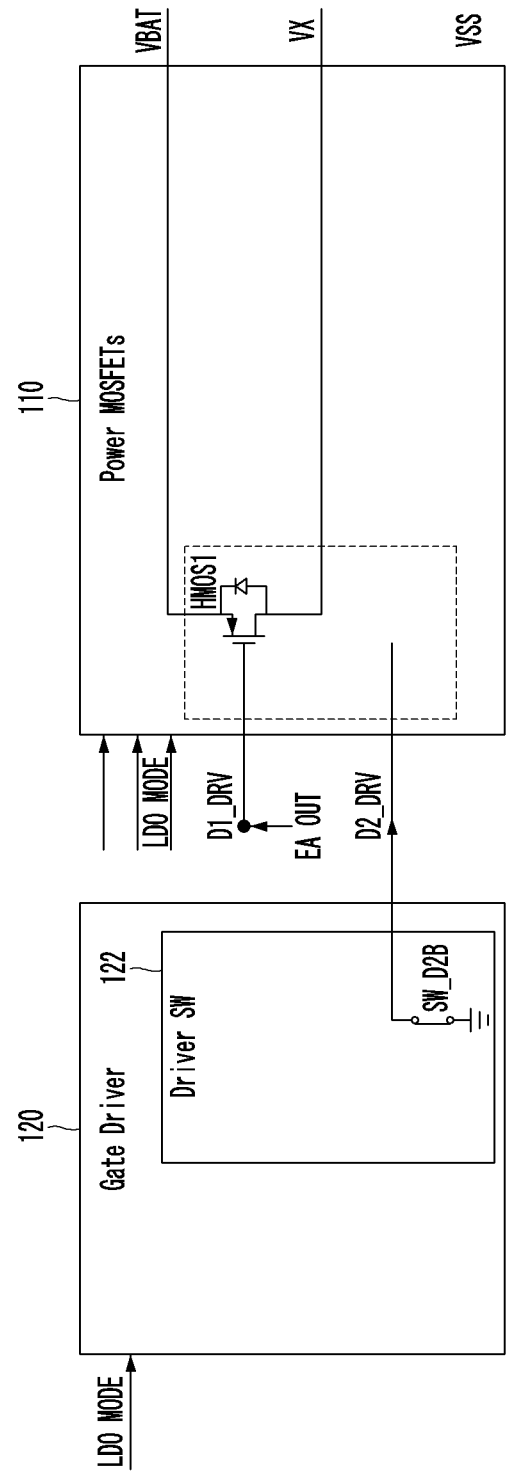
FIG. 8 is a diagram showing the LDO mode operation of the mode common power switch circuit 110 of the power circuit according to an embodiment of the present invention.

FIG. 8 is a diagram showing the LDO mode operation of the mode common power switch circuit 110 of the power circuit according to an embodiment of the present invention.

In the LDO mode, SW_D1 and SW_D2A in the driver switch circuit 122 may be turned off, SW_D2B may be turned on, and D2_DRV may be fixedly connected to the ground VSS. In the power MOSFETS, SW_P1, SW_P2, SW_N1, and SW_N2 may be turned off, and, among the plurality of split segments, HMOS1 may be selectively turned on, LMOS1 may be turned off as D2_DRV is fixedly connected to the ground VSS, and HMOS 2, HMOS3, LMOS2, and LMOS3 may also be turned off and operated.

Figure 9:
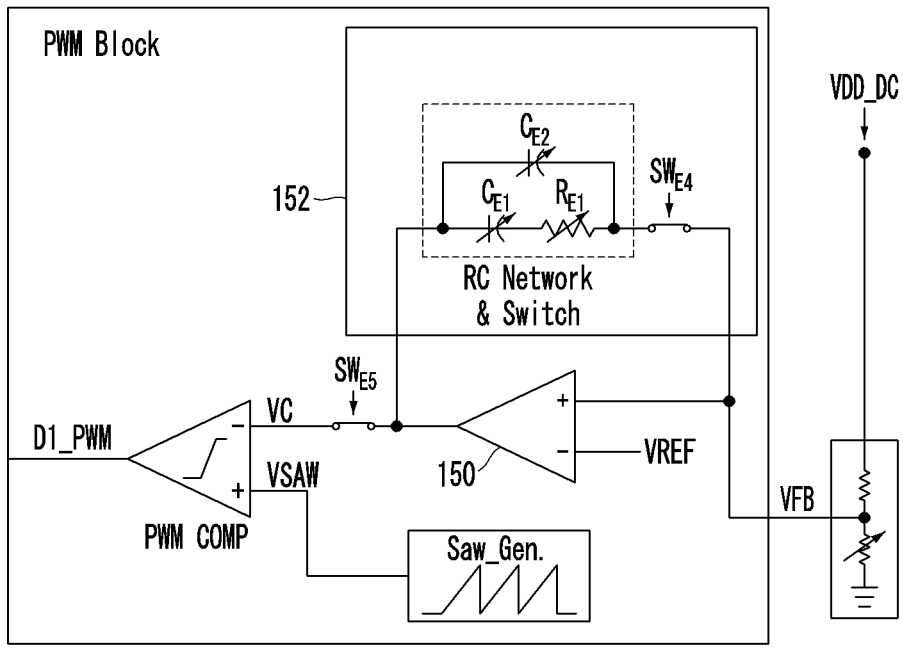
FIG. 9 is a diagram showing the PWM mode operations of the mode common error amplifier 150 and resistor-capacitor network 152 of the power circuit according to an embodiment of the present invention.

FIG. 9 is a diagram showing the PWM mode operations of the mode common error amplifier 150 and resistor-capacitor network 152 of the power circuit according to an embodiment of the present invention.

Referring to FIG. 9, in the PWM mode, the first switch $SW_{E1}$, the second switch $SW_{E2}$, and the third switch $SW_{E3}$ within the RC network & switch block 152 in the PWM Block may be turned off and the fourth switch $SW_{E4}$ and the fifth switch $SW_{E5}$ may be turned on, so that the passive elements $C_{E1}$, $C_{E2}$, and $R_{E1}$ in the RC network & switch block 152 may operate as an RC compensation network for the EA 150 and the EA 150 and PWM COMP may operate in the PWM mode.

Figure 10:
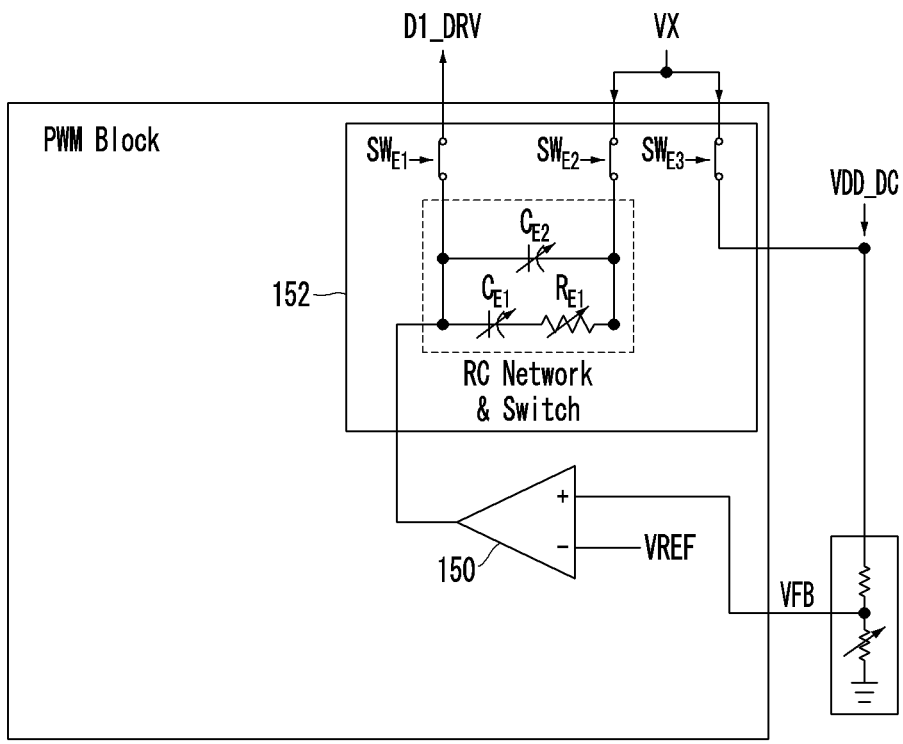
FIG. 10 is a diagram illustrating the LDO mode operations of the mode common error amplifier 150 and resistor-capacitor network 152 of the power circuit according to an embodiment of the present invention.

FIG. 10 is a diagram illustrating the LDO mode operations of the mode common error amplifier 150 and resistor-capacitor network 152 of the power circuit according to an embodiment of the present invention.

Figure 11:
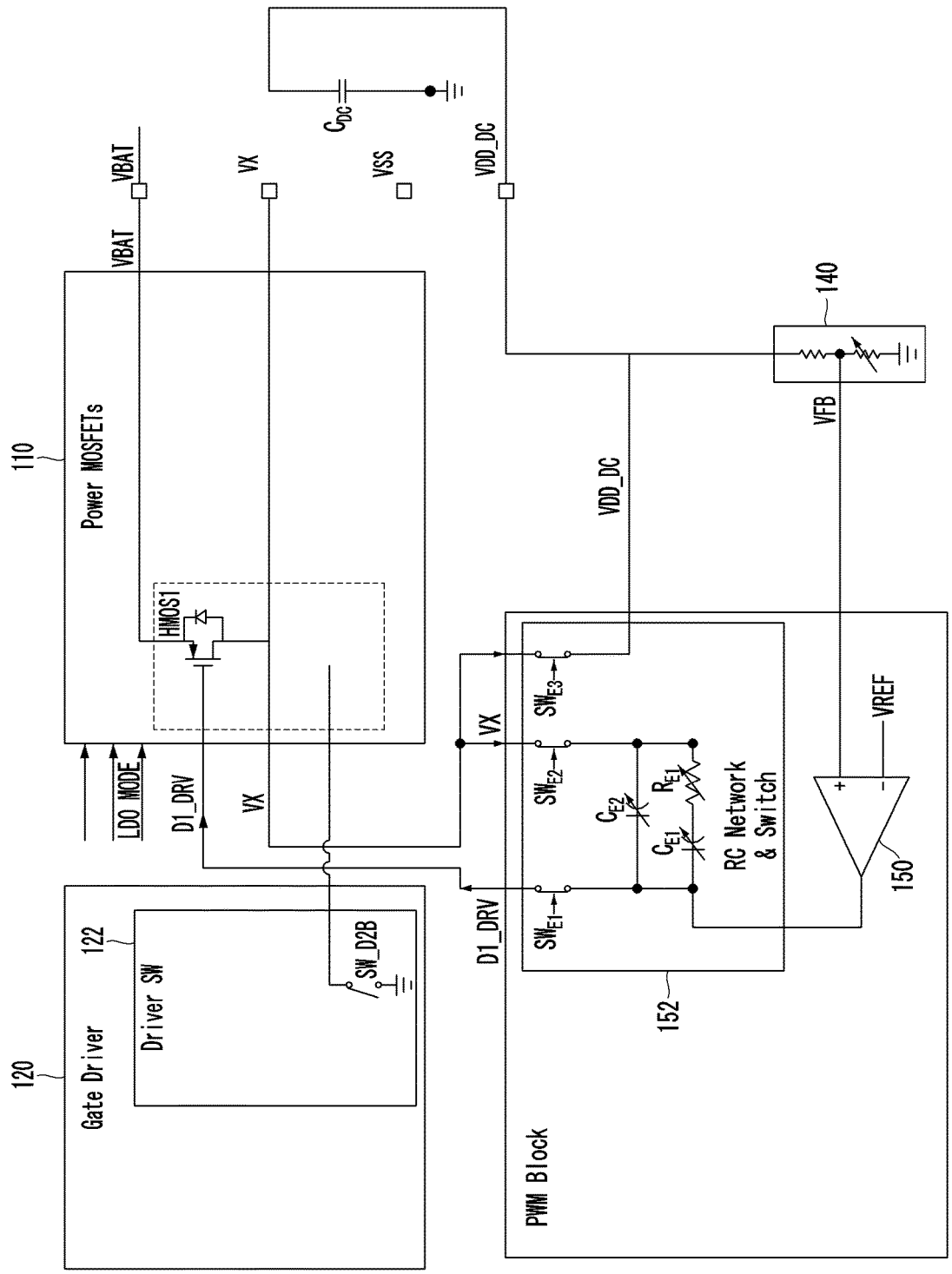
FIG. 11 is a diagram showing the combination of the operations of FIGS. 8 and 10 in an LDO mode.

FIG. 11 is a diagram showing the combination of the operations of FIGS. 8 and 10 in an LDO mode.

Referring to FIGS. 8, 10, and 11 together, in the LDO mode, the first switch $SW_{E1}$, the second switch $SW_{E2}$, and the third switch $SW_{E3}$ within the RC network & switch block 152 in the PWM Block may be turned on and the fourth switch $SW_{E4}$ and the fifth switch $SW_{E5}$ may be turned off, so that the passive elements $C_{E1}$, $C_{E2}$, and $R_{E1}$ in the RC network & switch block 152 can be used as a compensation circuit for adjusting the stability of the LDO regulator and the EA 150 can be operated as an amplifier for the LDO regulator.

Figure 12A:
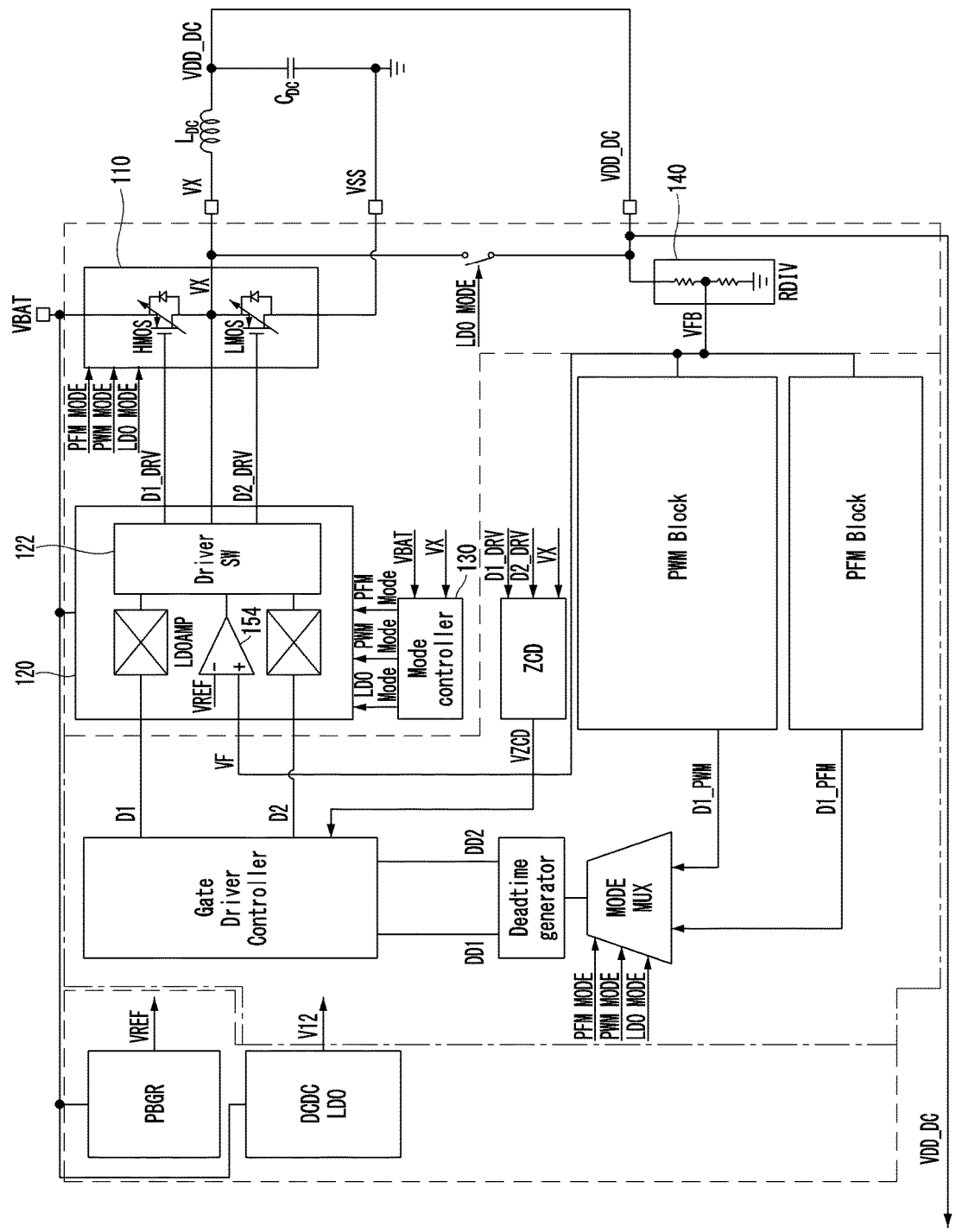
FIGS. 12A-12C are diagrams showing a power circuit according to another embodiment of the present invention.
Figure 12B:
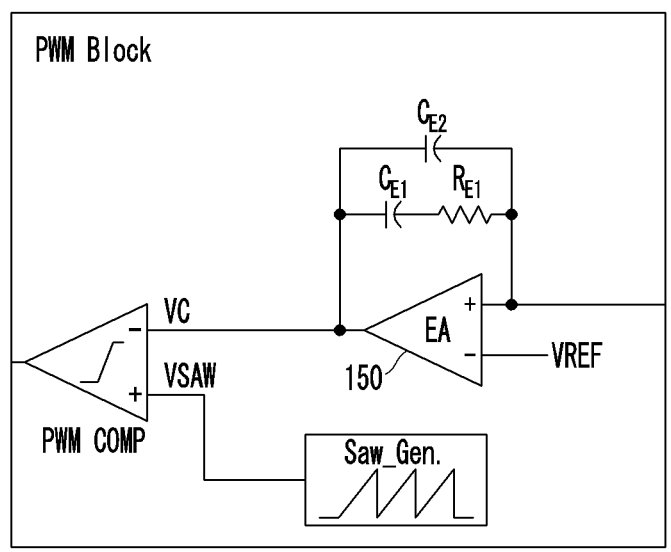
Figure 12C:
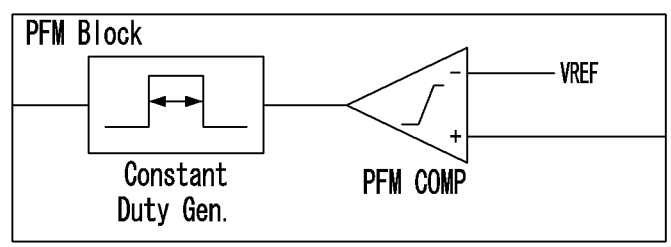

FIGS. 12A-12C are diagrams showing a power circuit according to another embodiment of the present invention.

The power circuit according to the embodiment of the present invention may further include an LDO mode error amplifier 154 configured to compare a feedback voltage signal VF, proportional to the voltage of the first node VX in the LDO mode, and a reference voltage signal VREF with each other and transfer an output signal, generated based on the results of the comparison, to the driver switch circuit 122.

The power circuit according to the embodiment of the present invention may include a first power switch HMOS, a second power switch LMOS, a capacitor CDC, an inductor LDC, a pulse frequency modulator (PFM Block), a pulse width modulator (PWM Block), a deadtime generator, a gate driver controller, a gate driver 120, a sensing & mode controller adapted to be a mode controller circuit 130, a zero current detector ZCD, a soft-start up, a DCDC LDO configured to generate internal power together with a MODE MUX, and a PBGR configured to generate an internal reference voltage, and is different from the power circuit of FIGS. 2A-2C in that an LDOAMP 154 may be disposed inside the gate driver 120.

The operation mode of the embodiment of FIGS. 12A-12C is the same as that of the embodiment of FIGS. 2A-2C, and may be set to any one of an LDO mode, a PFM mode, and a PWM mode.

Figure 13:
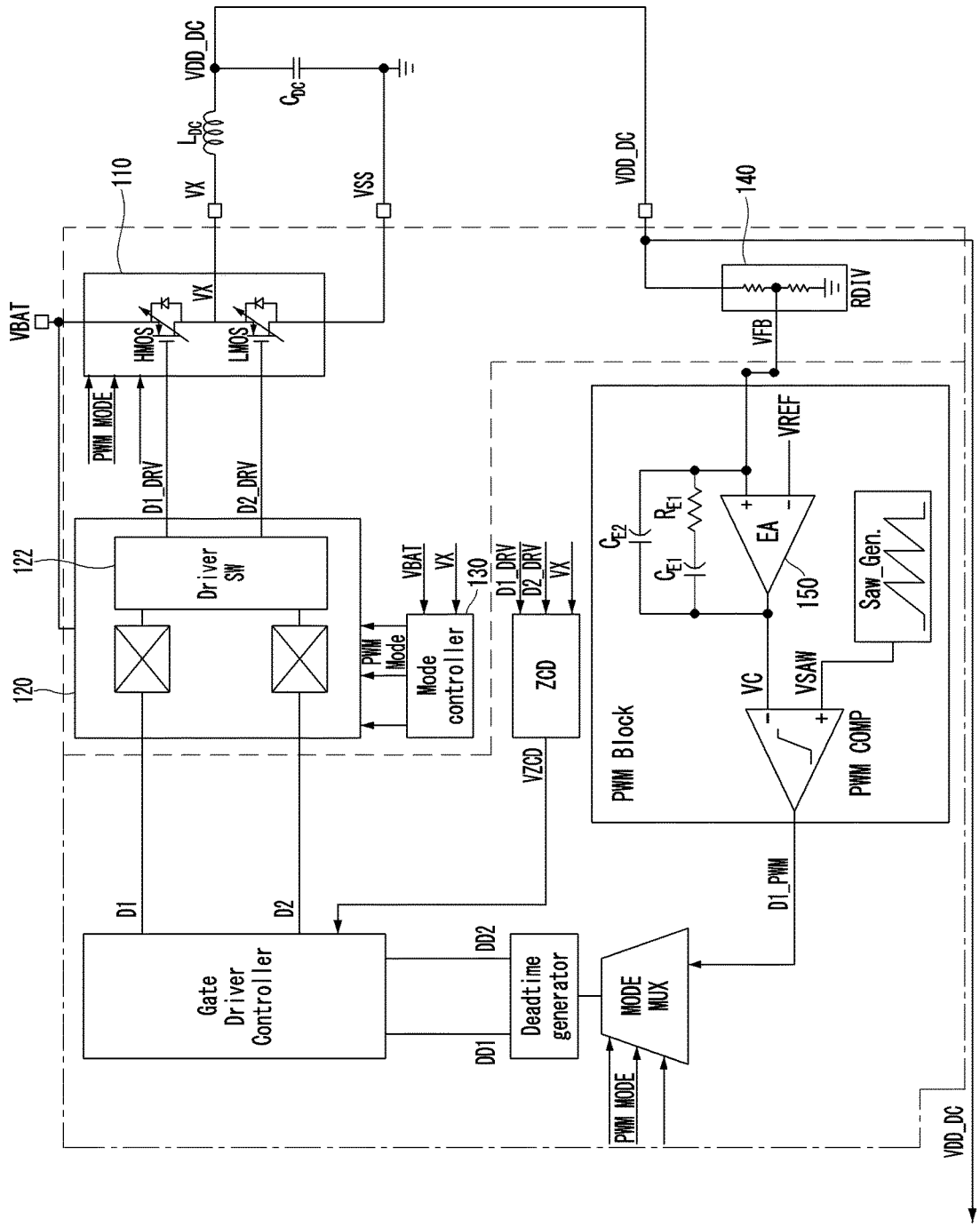
FIG. 13 is a diagram showing circuits that are activated in a PWM mode in the embodiment of FIGS. 12A-12C.

FIG. 13 is a diagram showing circuits that are activated in a PWM mode in the embodiment of FIGS. 12A-12C.

The PWM mode is a continuous mode. When an operation is performed in this continuous mode, the pulse width modulator (PWM Block), the MODE MUX, the deadtime generator, the gate driver controller, the gate driver 120, the power MOSFETs, the sensing & mode controller, the ZCD, the feedback resistor, and the soft-start up may be activated and operated.

In this case, the MODE MUX may be changed to receive a signal D1_PWM, the gate driver 120 and the power MOSFETs may be selected and operated to fit the PWM mode, and the LDOAMP 154 in the gate driver 120 may be turned off.

Figure 14:
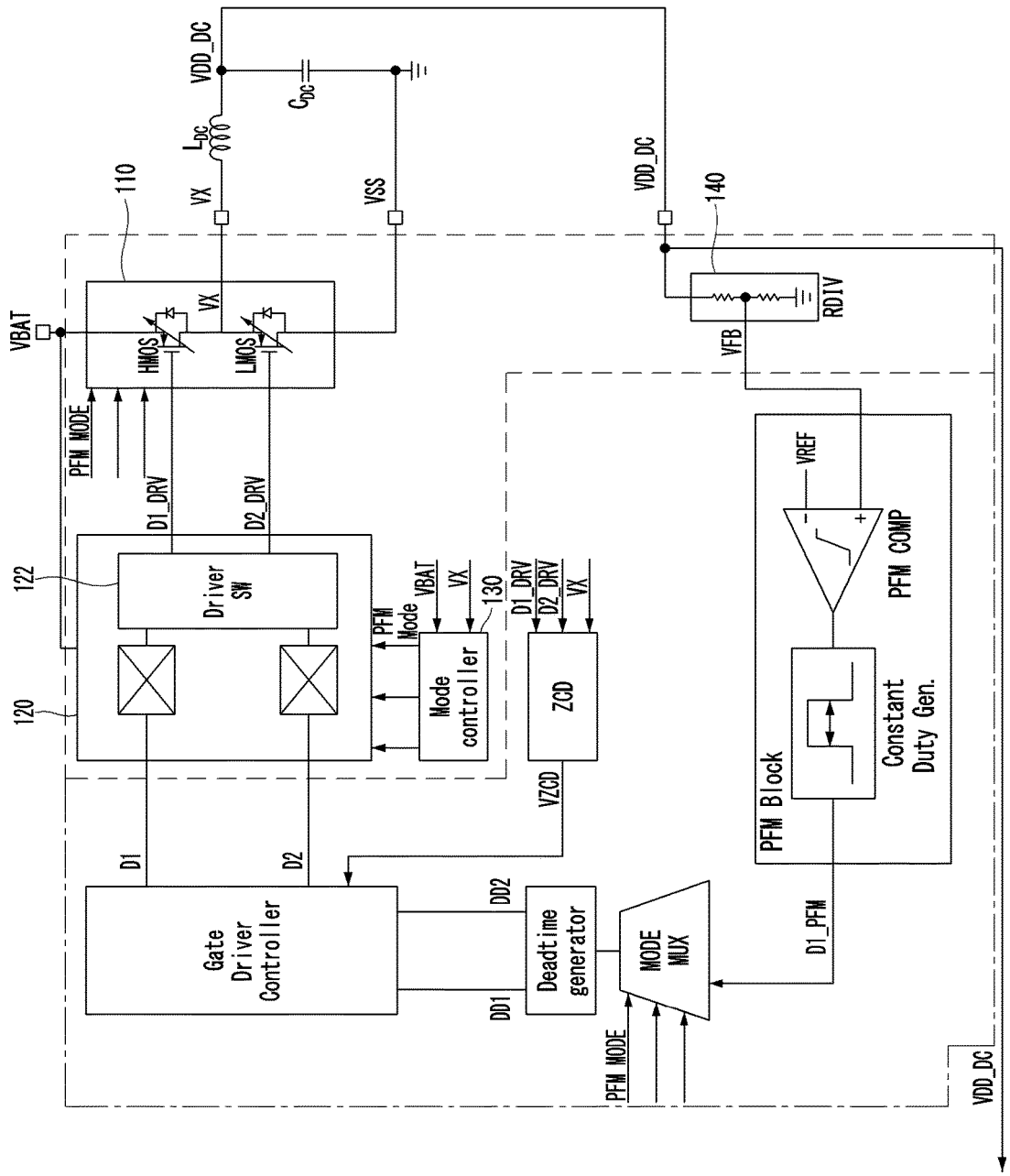
FIG. 14 is a diagram showing circuits that are activated in a PFM mode in the embodiment of FIGS. 12A-12C.

FIG. 14 is a diagram showing circuits that are activated in a PFM mode in the embodiment of FIGS. 12A-12C.

The PFM mode is a discontinuous mode. When an operation is performed in this discontinuous mode, the pulse frequency modulator (PFM Block), the MODE MUX, the deadtime generator, the gate driver controller, the gate driver 120, the power MOSFETs, the sensing & mode controller, the ZCD, the feedback resistor, and the soft-start up may be activated and operated.

In this case, the MODE MUX may be changed to receive a signal D1_PFM, the gate driver 120 and the power MOSFETs may be selected and operated to fit the PFM mode, and the LDOAMP 154 in the gate driver 120 may be turned off.

Figure 15:
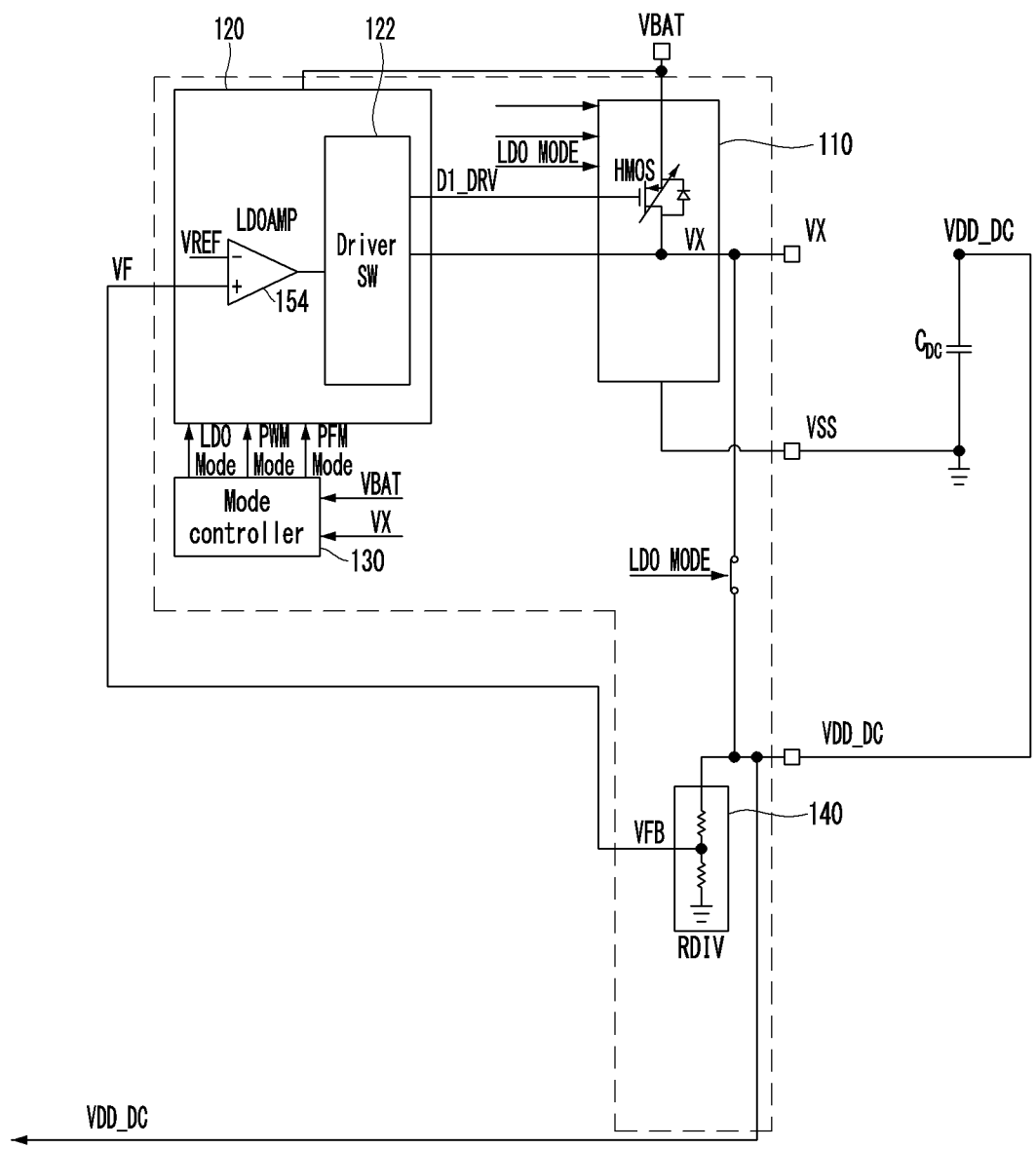
FIG. 15 is a diagram showing circuits that are activated in an LDO mode in the embodiment of FIGS. 12A-12C.

FIG. 15 is a diagram showing circuits that are activated in an LDO mode in the embodiment of FIGS. 12A-12C.

Referring to FIG. 15, in the LDO mode, the gate driver 120, the sensing & mode controller, the HMOS of the power MOSFTETs, the feedback resistor, and the soft-start up may be activated and operated.

The LDOAMP 154 of the gate driver 120 may be turned on, may compare the reference voltage VREF output from the PBGR and the feedback voltage signal VF with each other, and may control the operation of the first power switch HMOS using the output D1_DRV of the driver switch circuit 122. When the feedback voltage signal VF is lower than the reference voltage VREF, the output voltage of the LDOAMP 154 and the corresponding output D1_DRV of the driver switch circuit 122 may change in a decreasing direction, and the first power switch HMOS may be turned on more strongly and operate to increase the output power voltage VDD_DC.

In contrast, when the feedback voltage signal VF is higher than the reference voltage VREF, the output voltage of the LDOAMP 154 and the corresponding output D1_DRV of the driver switch circuit 122 may change in an increasing direction, and the first power switch HMOS may be turned on more weakly and operate to decrease the output power voltage VDD_DC. In this case, the capacitor CDC may be used as a load capacitor for the low-dropout regulator according to the topology.

Figure 16:
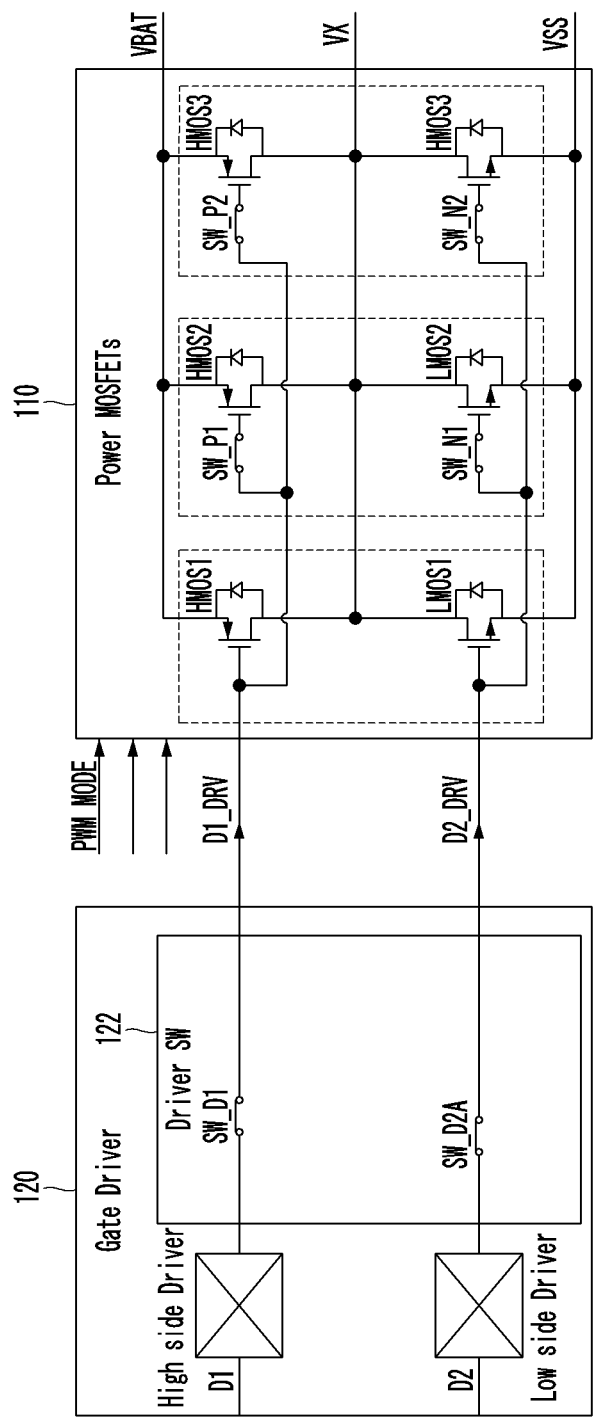
FIG. 16 is a diagram showing the PWM mode operation of the mode common power switch circuit 110 of the power circuit according to the embodiment of FIGS. 12A-12C.

FIG. 16 is a diagram showing the PWM mode operation of the mode common power switch circuit 110 of the power circuit according to the embodiment of FIGS. 12A-12C.

In the PWM mode, the LDOAMP 154 may be turned off, and a high side driver and a low side driver may be turned on. SW_D1 and SW_D2A in the driver switch circuit 122 may be turned on, and SW_A1A, SWA1B, and SW_D2B may be turned off.

SW_P1, SW_P2, SW_N1, and SW_N2 in the power MOSFETs may be turned on, and HMOS1, HMOS2, HMOS3, LMOS1, LMOS2, and LMOS3 among the plurality of split segments may be turned on and operated.

Figure 17:
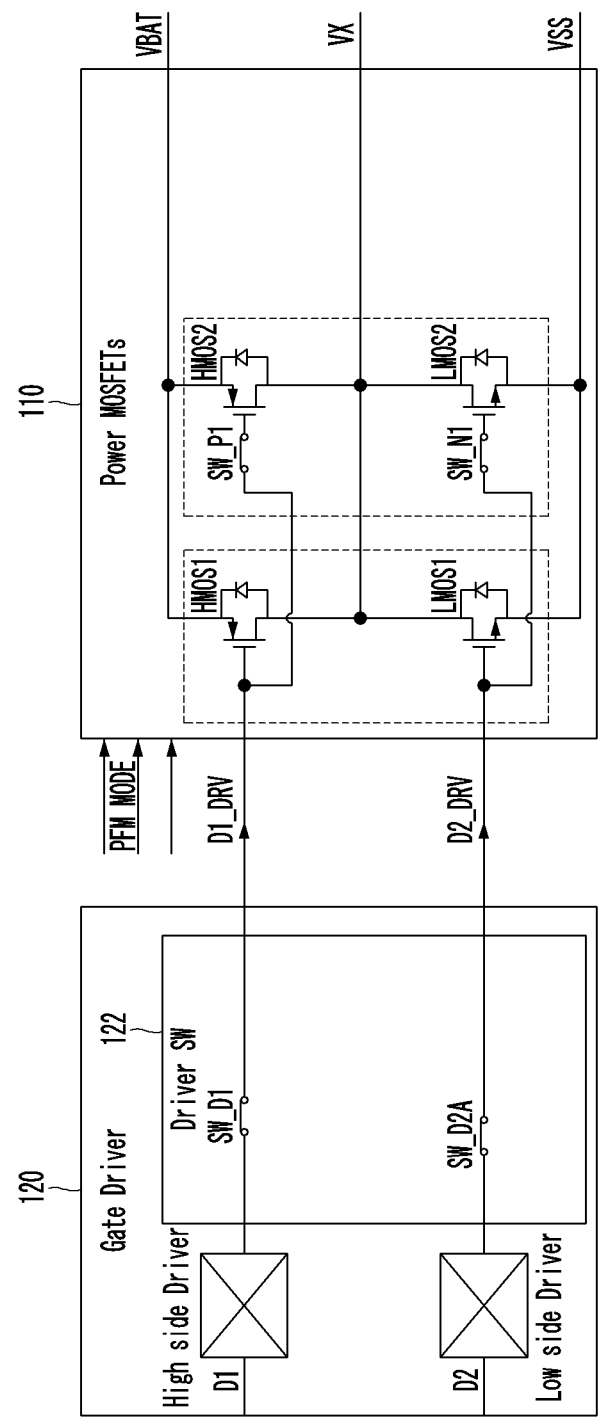
FIG. 17 is a diagram showing the PFM mode operation of the mode common power switch circuit 110 of the power circuit according to the embodiment of FIGS. 12A-12C.

FIG. 17 is a diagram showing the PFM mode operation of the mode common power switch circuit 110 of the power circuit according to the embodiment of FIGS. 12A-12C.

In the PFM mode, the LDOAMP 154 may be turned off, and the high side driver and the low side driver may be turned on. SW_D1 and SW_D2A in the driver switch circuit 122 may be turned on, and SW_A1A, SWA1B, and SW_D2B may be turned off.

SW_P1 and SW_N1 in the power MOSFETs may be turned on, SW_P2 and SW_N2 may be turned off, HMOS1, HMOS, LMOS1 and LMOS2 may be turned on, and HMOS3 and LMOS3 may be turned off and operated.

Figure 18:
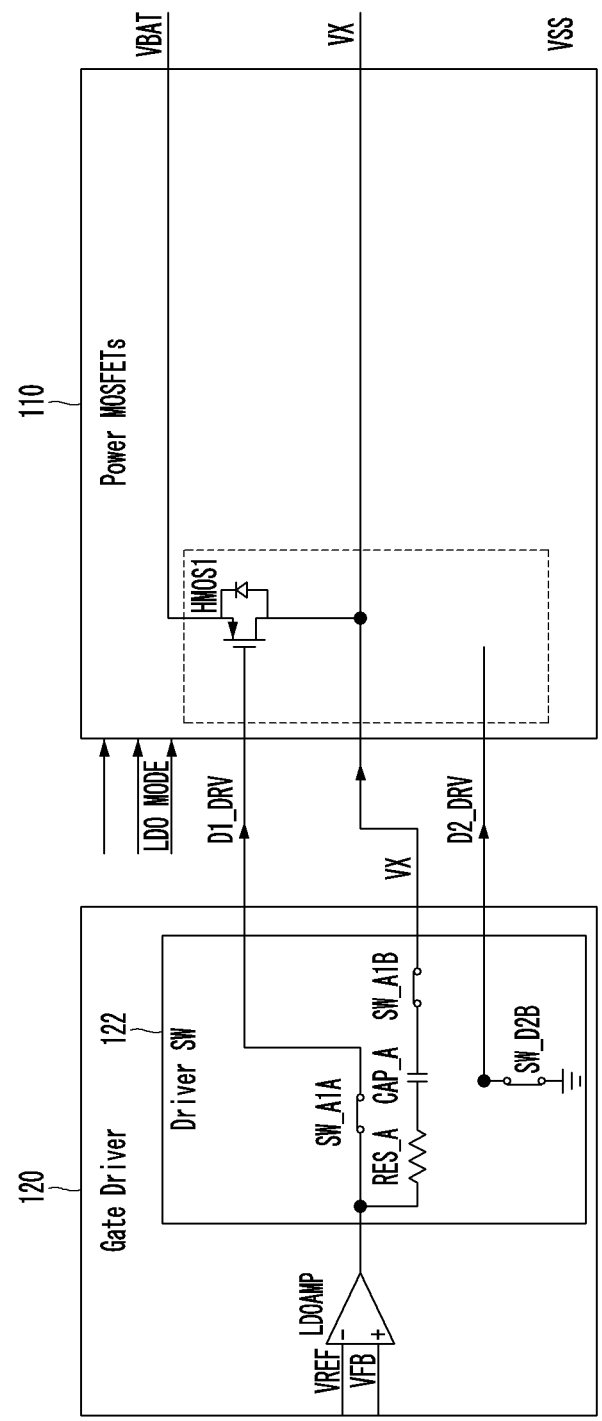
FIG. 18 is a diagram showing the LDO mode operation of the mode common power switch circuit 110 of the power circuit according to the embodiment of FIGS. 12A-12C.

FIG. 18 is a diagram showing the LDO mode operation of the mode common power switch circuit 110 of the power circuit according to the embodiment of FIGS. 12A-12C.

Figure 19:
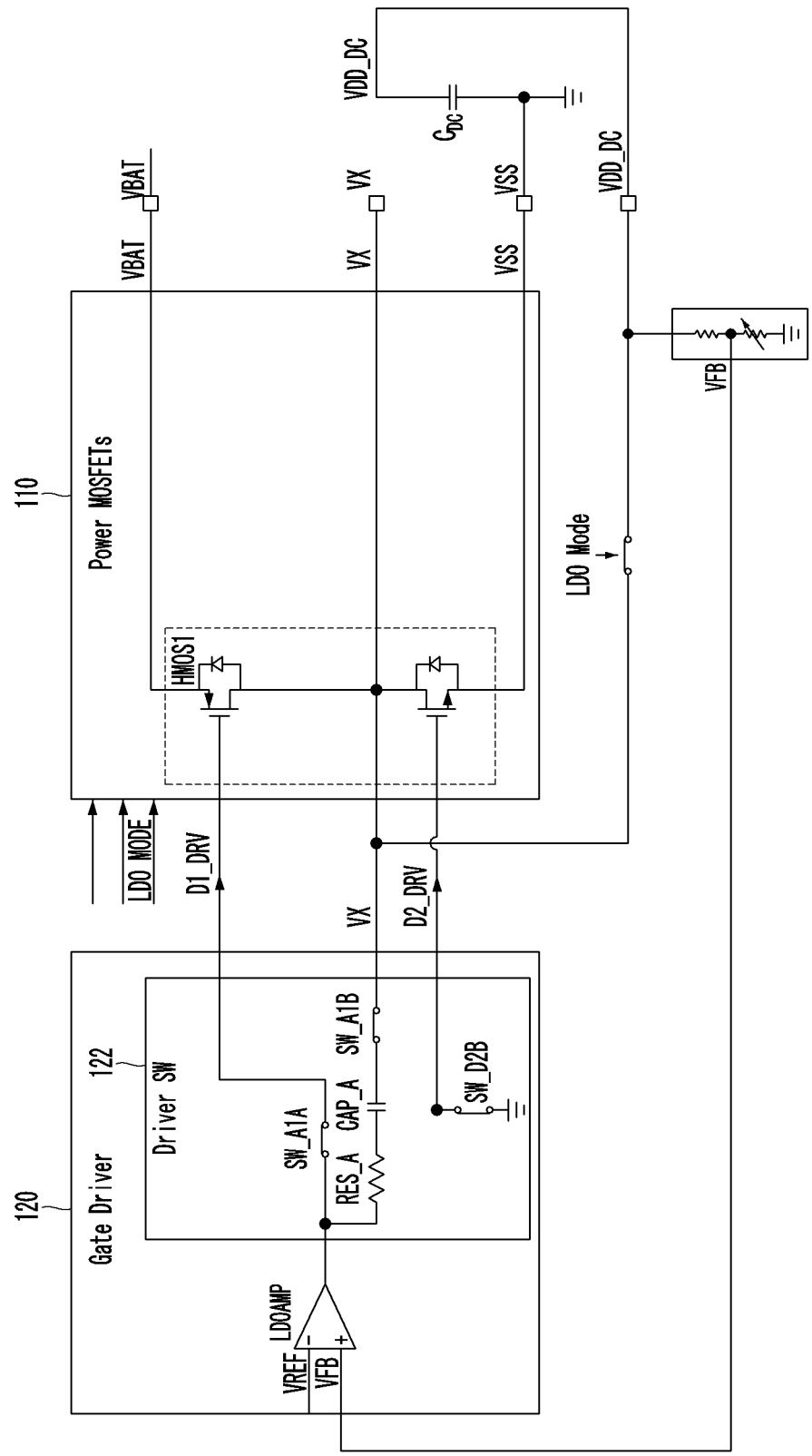
FIG. 19 is a diagram showing the LDO mode operation of the power circuit according to the embodiment of FIGS. 12A-12C.

FIG. 19 is a diagram showing the LDO mode operation of the power circuit according to the embodiment of FIGS. 12A-12C.

Referring to FIGS. 18 and 19 together, in the LDO mode, the LDOAMP 154 may be turned on, and the high side driver and the low side driver may be turned off.

SW_D1 and SW_D2A in the driver switch circuit 122 may be turned off, and SW_A1A, SWA1B, and SW_D2B may be turned on. SW_D2B may be turned on, and thus D2_DRV may be fixedly connected to the ground VSS.

The passive elements RES_A and CAP_A in the driver switch circuit 122 are used as an RC compensation network for adjusting the stability of the low-dropout regulator LDO.

SW_P1, SW_P2, SW_N1, and SW_N2 in the power MOSFETs may be turned off, HMOS1 may be turned on, and LMOS1 may be turned off as D2_DRV may be fixedly connected to the ground VSS. In this case, HMOS2, HMOS3, LMOS2, and LMOS3 may also be turned off and operated.

Figure 20:
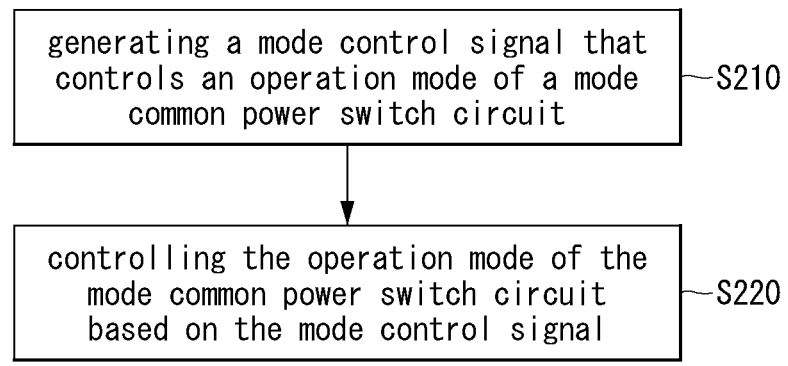
FIG. 20 is an operational flowchart showing a method of operating a power circuit according to an embodiment of the present invention.

FIG. 20 is an operational flowchart showing a method of operating a power circuit according to an embodiment of the present invention.

The method of operating a power circuit according to the embodiment of the present invention is a method of operating a power circuit to generate an output power voltage from an input power voltage, and includes: step S210 of generating a mode control signal that controls the operation mode of the mode common power switch circuit 110 connected to the input power voltage node VBAT to which the input power voltage is applied and the first node VX which generates the output power voltage; and step S220 of controlling the operation mode of the mode common power switch circuit 110 to any one of at least one pulse modulation mode and an LDO mode based on the mode control signal.

In step S220 of controlling the operation mode of the mode common power switch circuit 110, at least some of the plurality of split segments included in the first power switch HMOS constituting the high side switch in the mode common power switch circuit 110 may be selectively turned on based on the mode control signal.

In step S220 of controlling the operation mode of the mode common power switch circuit 110, a feedback voltage signal VF proportional to an output power voltage may be generated by a feedback circuit connected to the output power voltage node VDD_DC that outputs the output power voltage.

Figure 21:
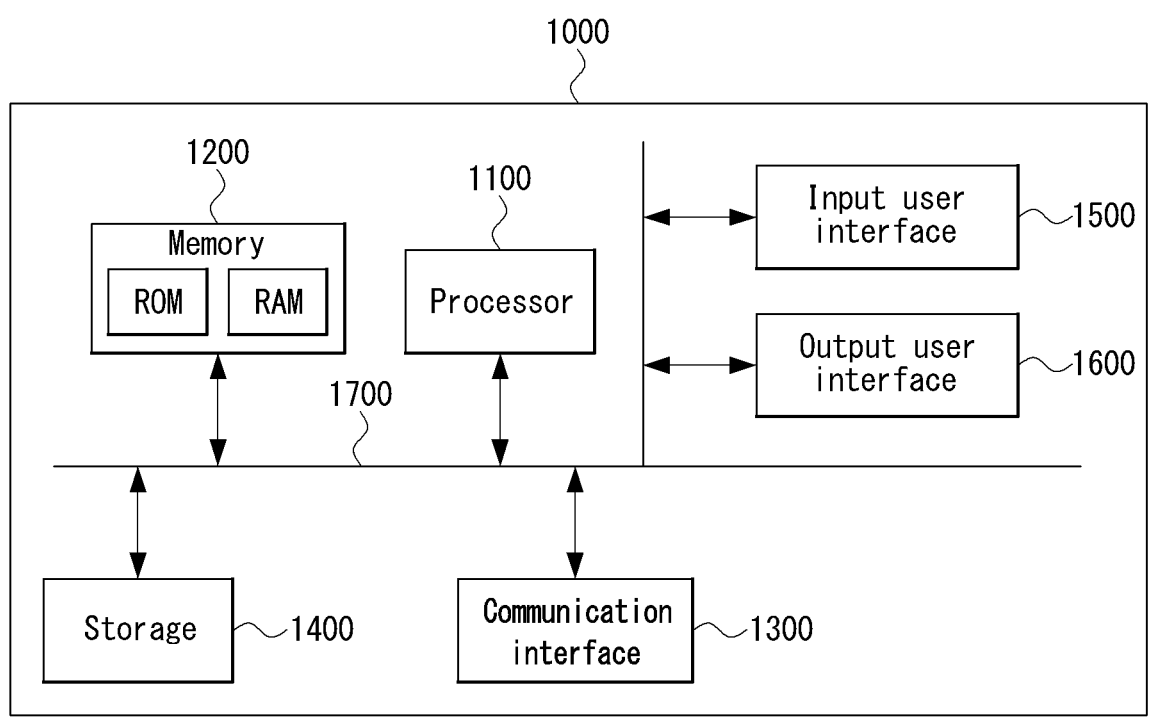
FIG. 21 is a conceptual diagram showing an example of the controller, microcontroller unit (MCU), or computing system of a generalized power circuit capable of performing at least some of the processes of FIGS. 2A to 20.

FIG. 21 is a conceptual diagram showing an example of the controller, microcontroller unit (MCU), or computing system of a generalized power circuit capable of performing at least some of the processes of FIGS. 2A to 20.

At least some steps of the method according to the embodiment of the present invention shown in FIG. 20 may be performed by the computing system 1000 of FIG. 21.

Referring to FIG. 21, the computing system 1000 according to an embodiment of the present invention may include a processor 1100, memory 1200, a communication interface 1300, a storage device 1400, an input interface 1500, an output interface 1600, and a bus 1700.

The computing system 1000 according to the example embodiment of the present disclosure may include the at least one processor 1100 and the memory 1200 in which instructions for the processor 1100 to perform at least one operation are stored. At least some operations of a method according to an example embodiment of the present disclosure may be performed by the at least one processor 1100 loading instructions from the memory 1200 and executing the instructions.

The processor 1100 may be a central processing unit (CPU), a graphics processing unit (GPU), or a dedicated processor for performing methods according to example embodiments of the present disclosure.

Each of the memory 1200 and the storage 1400 may be configured using at least one of a volatile storage medium and a non-volatile storage medium. For example, the memory 1200 may be configured using at least one of a read-only memory (ROM) and a random-access memory (RAM).

The computing system 1000 may include the communication interface 1300 that performs communication through a wireless network.

Also, the computing system 1000 may further include the storage 1400, the input interface 1500, the output interface 1600, and the like.

The elements included in the computing system 1000 may be connected through the bus 1700 and communicate with each other.

Examples of the computing system 1000 of the present disclosure may be a desktop computer, a laptop computer, a notebook, a smart phone, a tablet personal computer (PC), a mobile phone, a smart watch, smart glasses, an e-book reader, a portable multimedia player (PMP), a portable game machine, a navigation device, a digital camera, a digital multimedia broadcasting (DMB) player, a digital audio recorder, a digital audio player, a digital video recorder, a digital video player, a personal digital assistant (PDA), and the like which can perform communication.

The computing system 1000 according to the embodiment of the present invention may include: the at least one processor 1100; and the memory 1200 configured to store instructions that each instruct the at least one processor 1100 to perform at least one step. At least some steps of the method according to the embodiment of the present invention may be performed in such a manner that the at least one processor 1100 loads instructions from the memory 1200 and executes them.

The processor 1100 may refer to a central processing unit (CPU), a graphics processing unit (GPU), or a dedicated processor by which methods according to embodiments of the present invention are performed.

Each of the memory 1200 and the storage device 1400 may be composed of at least one of a volatile storage medium and a non-volatile storage medium. For example, the memory 1200 may be composed of at least one of read-only memory (ROM) and random access memory (RAM).

The computing system 1000 may further include the communication interface 1300 configured to perform communication over a wireless network.

Additionally, the computing system 1000 may further include the storage device 1400, the input interface 1500, and the output interface 1600.

Additionally, the individual components included in the computing system 1000 may be connected by the bus 1700 and communicate with each other.

Examples of the computing system 1000 according to the embodiment of the present invention include a communication-capable desktop computer, a laptop computer, a notebook, a smartphone, a tablet personal computer (PC), a mobile phone, a smart watch, smart glasses, an e-book reader, a portable multimedia player (PMP), a portable game console, a navigation device, a digital camera, a digital multimedia broadcasting (DMB) player, a digital audio recorder, a digital audio player, a digital video recorder, a digital video player, a personal digital assistant (PDA), etc.

According to an embodiment of the present invention, the DC-DC converter and the continuously operating LDO regulator may be integrated into a single circuit without increasing the area thereof.

According to an embodiment of the present invention, the operation mode of the mode common power switch used in common for a plurality of operation modes may be controlled to any one of a DC-DC converter mode and an LDO mode. In this case, the DC-DC converter mode may be any one of a PWM mode and a PFM mode.

According to an embodiment of the present invention, there may be provided the low-power, high-efficiency power circuit that reduces the area thereof by using the mode common power switch circuit shared between a DC-DC converter mode and an LDO mode, is which required for efficient low-power operation.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

According to example embodiments of the present disclosure, it is possible to reduce the load of a process of generating natural language text describing an image.

According to example embodiments of the present disclosure, it is possible to generate natural language text describing not only objects which are detectable in an image but also the image itself.

According to example embodiments of the present disclosure, it is possible to reduce a training time of a model for generating natural language text describing an image.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A power circuit for generating an output power voltage from an input power voltage, the power circuit comprising:
    an input power voltage node configured such that the input power voltage is applied thereto;
    a first node configured to generate the output power voltage;
    a mode common power switch circuit connected to the input power voltage node and the first node; and
    a mode controller circuit configured to generate a mode control signal that controls an operation mode of the mode common power switch circuit to be any one of at least one pulse modulation mode or a low-dropout (LDO) mode,
    wherein, in the LDO mode:
        an output signal of a comparator generated based on results of a comparison between a feedback voltage signal and a reference voltage is transferred to an input of the mode common power switch circuit via a first switch, and
        the first node is directly connected to the output power voltage node via a third switch.

2. The power circuit of claim 1, wherein the mode common power switch circuit comprises:
    a first power switch configured to form a high side switch and include a plurality of split segments; and
    a second power switch configured to form a low side switch,
    wherein at least some of the plurality of split segments are selectively turned on based on the mode control signal.

3. The power circuit of claim 2, further comprising a driver switch circuit configured to selectively apply a driving signal to the at least some of the plurality of split segments to be turned on based on the mode control signal.

4. The power circuit of claim 3, further comprising an LDO mode error amplifier configured to compare a feedback voltage signal, proportional to a voltage of the first node in the LOD mode, and a reference voltage signal to generate an output signal based on results of the comparison, and transfer the output signal to the driver switch circuit.

5. The power circuit of claim 1, further comprising:
    an output power voltage node configured to output the output power voltage; and
    a feedback circuit connected to the output power voltage node and configured to generate the feedback voltage signal proportional to the output power voltage.

6. The power circuit of claim 5, wherein, in the at least one pulse modulation mode,
    the first node is connected to the output power voltage node via an inductor,
    the feedback voltage signal is transferred to an input of a comparator and compared with a reference voltage, and
    an output signal of the comparator generated based on results of a comparison between the feedback voltage signal and the reference voltage is transferred to a timing control circuit.

7. A power circuit for generating an output power voltage from an input power voltage, the power circuit comprising:
    an input power voltage node configured such that the input power voltage is applied thereto;
    a first node configured to generate the output power voltage;
    a mode common power switch circuit connected to the input power voltage node and the first node;
    a mode controller circuit configured to generate a mode control signal that controls an operation mode of the mode common power switch circuit to be any one of at least one pulse modulation mode or a low-dropout (LDO) mode;
    a mode common error amplifier configured to operate in common in the at least one pulse modulation mode and the LDO mode; and
    a resistor-capacitor network configured such that one end thereof is connected to an output terminal of the mode common error amplifier and other end thereof is connected to an input terminal of the mode common error amplifier via a fourth switch,
    wherein the one end of the resistor-capacitor network is connected to an input of the mode common power switch circuit via a first switch, and the other end of the resistor-capacitor network is connected to the first node via a second switch, so that the resistor-capacitor network operates as a compensation circuit for the mode common power switch circuit.

8. The power circuit of claim 7, further comprising:
    an output power voltage node configured to output the output power voltage; and
    a feedback circuit connected to the output power voltage node and configured to generate a feedback voltage signal proportional to the output power voltage,
    wherein, in the LDO mode,
        the feedback voltage signal and a reference voltage are input to the mode common error amplifier, and
        an output signal of the mode common error amplifier is transferred to an input of the mode common power switch circuit via the first switch.

9. The power circuit of claim 7, further comprising:
    an output power voltage node configured to output the output power voltage; and a feedback circuit connected to the output power voltage node and configured to generate a feedback voltage signal proportional to the output power voltage, wherein, in a pulse width modulation mode of the at least one pulse modulation mode, the other end of the resistor-capacitor network is connected to the feedback voltage signal via a fourth switch, so that the resistor-capacitor network operates as a compensation circuit that is connected to input and output terminals of the mode common error amplifier.

10. A method of operating a power circuit to generate an output power voltage from an input power voltage, the method comprising:

generating a mode control signal that controls an operation mode of a mode common power switch circuit connected to an input power voltage node to which the input power voltage is applied and a first node which generates the output power voltage; and controlling the operation mode of the mode common power switch circuit to be any one of at least one pulse modulation mode and or a low-dropout (LDO) mode based on the mode control signal, wherein, in the LDO mode, an output signal of a comparator generated based on results of a comparison between a feedback voltage signal and a reference voltage is transferred to an input of the mode common power switch circuit via a first switch, and the first node is directly connected to the output power voltage node via a third switch.

11. The method of claim 10, wherein, in controlling the operation mode of the mode common power switch circuit, at least some of a plurality of split segments included in a first power switch constituting a high side switch in the mode common power switch circuit are selectively turned on based on the mode control signal.

12. The method of claim 10, wherein, in controlling the operation mode of the mode common power switch circuit, the feedback voltage signal proportional to the output power voltage is generated by a feedback circuit connected to an output power voltage node that outputs the output power voltage.

13. The method of claim 12, wherein, in the at least one pulse modulation mode, the first node is connected to the output power voltage node via an inductor, the feedback voltage signal is transferred to an input of a comparator and compared with a reference voltage, and an output signal of the comparator generated based on results of a comparison between the feedback voltage signal and the reference voltage is transferred to a timing control circuit.

14. The method of claim 12, wherein, in the LDO mode, the feedback voltage signal and a reference voltage are input to a mode common error amplifier that operates in common in the at least one pulse modulation mode and the LDO mode, and an output signal of the mode common error amplifier is transferred to an input of the mode common power switch circuit via a first switch.

15. The method of claim 14, wherein one end of a resistor-capacitor network is connected to an output terminal of the mode common error amplifier, and the one end is connected to an input of the mode common power switch circuit via the first switch, and other end of the resistor-capacitor network is connected to the first node via a second switch, so that the resistor-capacitor network operates as a compensation circuit for the mode common power switch circuit.

16. The method of claim 12, wherein, in a pulse width modulation mode of the at least one pulse modulation mode, one end of a resistor-capacitor network is connected to an output terminal of a mode common error amplifier that operates in common in the pulse width modulation mode and the LDO mode, and other end of the resistor-capacitor network is connected to the feedback voltage signal via a fourth switch, so that the resistor-capacitor network operates as a compensation circuit that is connected to input and output terminals of the mode common error amplifier.

* * * * *